United States Patent
Kulkarni et al.

(10) Patent No.: US 11,107,133 B2
(45) Date of Patent: Aug. 31, 2021

(54) SYSTEMS AND METHODS FOR SELF-SERVE MARKETING PAGES WITH MULTI-ARMED BANDIT

(71) Applicant: CAPITAL ONE SERVICES, LLC, McLean, VA (US)

(72) Inventors: Kirankumar Kulkarni, McKinney, TX (US); Savio Joseph Darivemula, Plano, TX (US); Anil Konduru, Plano, TX (US); Patrick Manion, Frisco, TX (US); Ranganathan Mohan, Frisco, TX (US); Gunjan Patel, Frisco, TX (US); Sunil Vasisht, Frisco, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/391,299

(22) Filed: Apr. 23, 2019

(65) Prior Publication Data
US 2020/0342500 A1 Oct. 29, 2020

(51) Int. Cl.
*G06Q 30/02* (2012.01)
*G06F 9/54* (2006.01)
*G06F 17/18* (2006.01)

(52) U.S. Cl.
CPC .......... *G06Q 30/0277* (2013.01); *G06F 9/54* (2013.01); *G06F 17/18* (2013.01)

(58) Field of Classification Search
CPC ........ G06Q 30/0277; G06F 17/18; G06F 9/54
See application file for complete search history.

(56) References Cited

U.S. PATENT DOCUMENTS

2009/0063377 A1* 3/2009 Brady ................. G06Q 30/02
706/20
2009/0282343 A1* 11/2009 Catlin ................ G06F 16/9535
715/738

(Continued)

OTHER PUBLICATIONS

"Beyond A/B Testing: Multi-armed Bandit Experiments" (Lu, Shaw Published on Apr. 3, 2019 and available at https://towardsdatascience.com/beyond-a-b-testing-multi-armed-bandit-experiments-1493f709f804) (Year: 2019).*

(Continued)

*Primary Examiner* — James M Detweiler
(74) *Attorney, Agent, or Firm* — Hunton Andrews Kurth LLP

(57) ABSTRACT

A system for online advertising. The system may include at least one memory unit for storing instructions and at least one processor configured to execute the instructions to perform operations. The operations may include receiving a plurality of creatives for a webpage published to a viewer and resulting in a viewer experience; measuring, based on the viewer experience, a result including conversion rates for a plurality of variants of the webpage; determining confidence intervals in association with the conversion rates; dynamically comparing the received creatives, the conversion rates, and the determined confidence intervals of the variants; automatically analyzing, based on the comparison, the variants to select a winning webpage, the winning webpage exceeding a computed threshold; and automatically adjusting online traffic such that the selected winning webpage is displayed more frequently than other webpages.

12 Claims, 26 Drawing Sheets

(56) References Cited

U.S. PATENT DOCUMENTS

| | | | |
|---|---|---|---|
| 2010/0082780 A1* | 4/2010 | Muilenburg | G06F 16/958 709/221 |
| 2012/0030012 A1* | 2/2012 | Fisher | G06Q 30/0247 705/14.46 |
| 2014/0222553 A1* | 8/2014 | Bowman | G06Q 30/0276 705/14.45 |
| 2017/0264521 A1* | 9/2017 | Gomez-Uribe | H04L 43/10 |
| 2018/0349943 A1* | 12/2018 | Ghavamzadeh | G06Q 30/0254 |
| 2019/0244110 A1* | 8/2019 | Qiu | G06N 3/126 |
| 2019/0244131 A1* | 8/2019 | Levi | G06N 5/04 |
| 2019/0303994 A1* | 10/2019 | Sesia | G06Q 30/0631 |

OTHER PUBLICATIONS

"Multi Armed Bandit Testing Can Make You More Money, Faster" (Ayyar, Rohan Jul. 12, 2016 at https://www.searchenginepeople.com/blog/16072-multi-armed-bandits-ab-testing-makes-money.html) (Year: 2016).*

* cited by examiner

FIG. 26

SYSTEMS AND METHODS FOR SELF-SERVE MARKETING PAGES WITH MULTI-ARMED BANDIT

TECHNICAL FIELD

The present disclosure relates generally to computer systems and machine learning for use in online marketing, and more particularly to an improved system and method for launching a marketing campaign using a self-serve tool and a multi-armed bandit application program interface (API).

BACKGROUND

Selecting advertisements to display on webpages is necessary for users to maximize their revenue. Historically, advertisers have relied on visitor demographics, previous purchase history, product selection, and other criteria to inform their advertising decisions. As an example, in some situations particular products may be selected by users and recommended to visitors in advertising banners placed at a top or side location in a webpage in order to convince a prospective customer to purchase a product for sale on the webpage. The objective may be to maximize total sales revenue.

In other situations, advertisements may be selected by users with a different objective. For example, users may select web advertisements and alter the layout of their webpages in order to increase the number of visits to their website. These objectives and others need not be mutually exclusive. To maximize sales revenue and to increase a number of webpage visits, users may also evaluate multiple versions of proposed webpages and advertisements as part of a testing or production phase to determine a singular or most profitable online digital experience.

Webpages are formed with various "creatives," e.g., color schemes, advertising banners, product images, etc. When accessed by a viewer, these webpages result in a digital "experience." Traditionally, Adobe NB testing has provided a comparison between two versions (A and B) of a webpage to determine which version generates the more profitable experience. Testing may be conducted in accordance with a number of clicks, sales, or other criteria to determine which version, or variant, achieves a better performance. Typically, Adobe NB testing includes placing a test web page in a production phase for a testing period, waiting for the testing to complete and the results of the testing to be collected, analyzing the testing results to determine web pages providing a winning experience or set of experiences, and then manually adjusting the flow of online or web traffic so that the winning webpages may be displayed to users.

However, Adobe NB testing suffers from numerous drawbacks. For example, a lengthy wait for results to be tabulated in NB testing may cause users a significant delay in making adjustments. Moreover, existing adjustment processes are manual in scope, leading to inefficiencies and inaccurate variants being displayed to potential customers. Additionally, display of suboptimal webpages may hinder the advertising of users aiming to improve their revenue stream. Further, identification of winning webpages using handheld mobile devices is also desirable to exploit handheld device capabilities and develop new applications.

Therefore, systems and methods are needed to assist users with creating and launching marketing webpages on-the-fly into production systems. In particular, systems and methods are needed for combining webpages into existing marketing campaigns with multiple experiences. Moreover, automated processes that allow for an online self-serve tool operating alongside a multi-armed bandit API, that is, an API that includes an algorithmic exploration phase and an exploitation phase, are needed to significantly shorten the time required to test out multiple creatives, as webpages are evaluated. Moreover, a multi-armed bandit API is needed to improve the efficiency and accuracy necessary to display winning webpages in real-time.

The disclosed online advertising system and methods using a self-serve tool and a multi-armed bandit application program interface to select a winning webpage may address one or more of the problems set forth above and/or other problems in the prior art.

SUMMARY

One aspect of the present disclosure is directed to a system for online advertising. The system may include at least one memory unit for storing instructions and at least one processor configured to execute the instructions to perform operations. The operations may include receiving a plurality of creatives for a webpage published to a viewer and resulting in a viewer experience; measuring, based on the viewer experience, a result including conversion rates for a plurality of variants of the webpages; determining confidence intervals in association with the conversion rates; dynamically comparing the received creatives, the conversion rates, and the determined confidence intervals of the variants; automatically analyzing, based on the comparison, the variants to dynamically select a winning webpage, the winning webpage exceeding a computed threshold; and automatically adjusting online traffic such that the selected winning webpage is displayed more frequently than other webpages.

Another aspect of the present disclosure is directed to a non-transitory computer-readable medium storing instructions that, when executed by a processor, cause the processor to perform operations. The operations may include receiving a plurality of creatives for a webpage published to a viewer and resulting in a viewer experience; measuring, based on the viewer experience, a result including conversion rates for a plurality of variants of the webpages; determining confidence intervals in association with the conversion rates; dynamically comparing the received creatives, the conversion rates, and the determined confidence intervals of the variants; automatically analyzing, based on the comparison, the variants to dynamically select a winning webpage, the winning webpage exceeding a computed threshold; and automatically adjusting online traffic such that the selected winning webpage is displayed more frequently than other webpages.

Yet another aspect of the present disclosure is directed to a computer-implemented method for online advertising. The method may include receiving a plurality of creatives for a webpage published to a viewer and resulting in a viewer experience; measuring, based on the viewer experience, a result including conversion rates for a plurality of variants of the webpages; determining confidence intervals in association with the conversion rates; dynamically comparing the received creatives, the conversion rates, and the determined confidence intervals of the variants; automatically analyzing, based on the comparison, the variants to dynamically select a winning webpage, the winning webpage exceeding a computed threshold; and automatically adjusting online traffic such that the selected winning webpage is displayed more frequently than other webpages.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIGS. 24-26 are illustrations representing a sequence of exemplary interfaces correlating to a self-serve tool of an online marketing campaign hub, consistent with disclosed embodiments.

DETAILED DESCRIPTION

The disclosure is generally directed to automated processes that operate alongside a self-serve tool and a multi-armed bandit engine to help users create and launch marketing webpages "on-the-fly" into production systems. In some embodiments, a user may operate a self-serve tool to select advertising for a winning webpage to be displayed to website visitors. In other embodiments, existing webpages may be added to an existing marketing campaign and a new winning webpage may be determined and then served to website visitors. In some embodiments, winning webpages may be communicated on graphical user interfaces and displayed on a handheld or mobile device. Reference will now be made in detail to the disclosed embodiments, examples of which are illustrated in the accompanying drawings.

Figure 1:
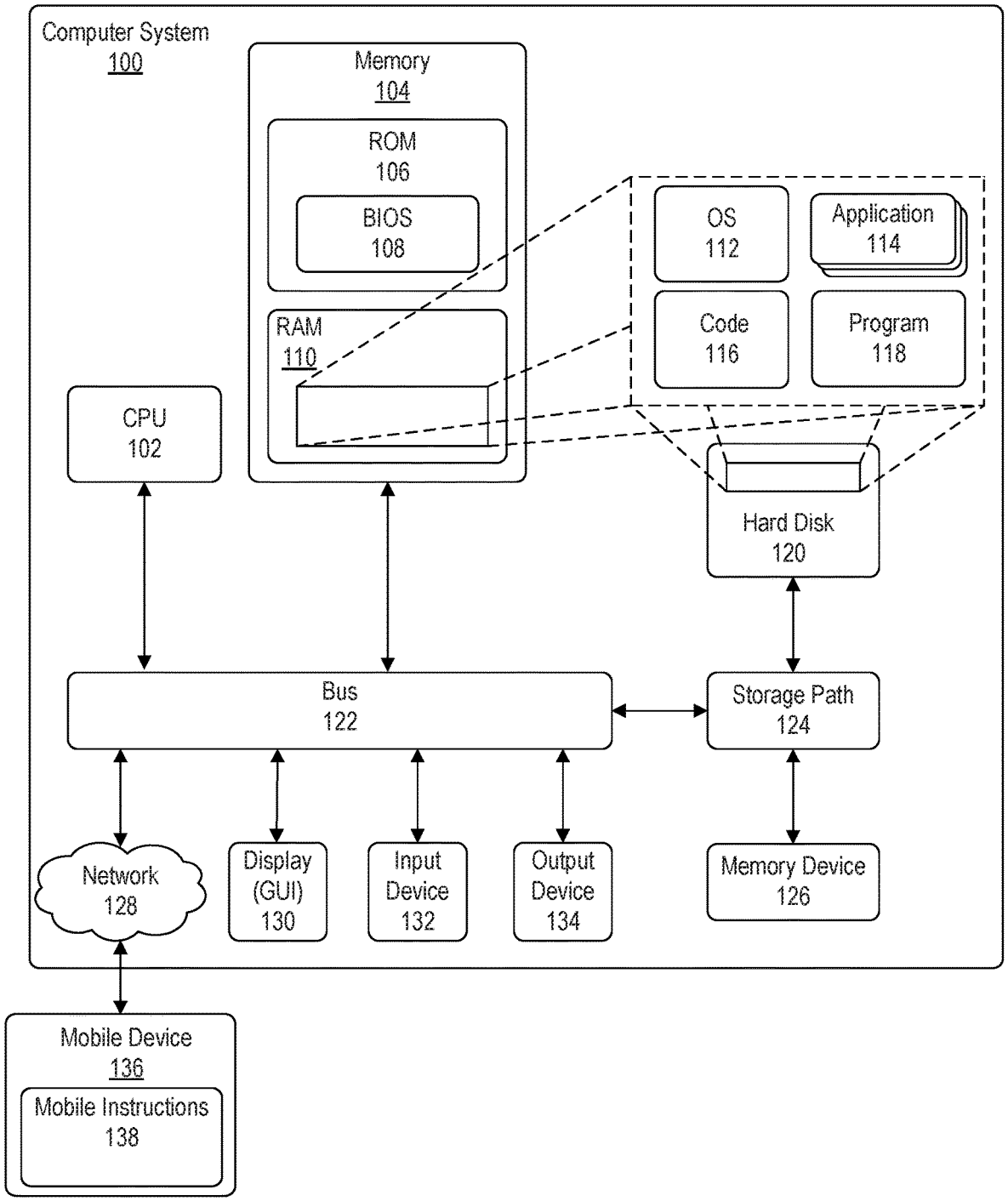
FIG. 1 is a block diagram representing a computer system, consistent with disclosed embodiments.

FIG. 1 is a block diagram of general purpose computer system 100, consistent with disclosed embodiments. Components of system 100 may include a central processing unit (CPU) or processor 102, a memory unit 104, and a bus 122 that interconnects system components including memory 104 and CPU 102. Bus 122 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer system 100 may include a variety of computer-readable media. Computer-readable media can be any available media that can be accessed by computer system 100. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer system 100.

Memory 104 includes computer-readable media such as read only memory (ROM) 106 and random access memory (RAM) 110. A basic input/output system (BIOS) 108, containing the basic routines that help to transfer information between elements within computer system 100 is typically stored in ROM 106. Additionally, RAM 110 may contain operating system (OS) 112, applications 114, other code 116 that may be executed by one or more different programs, and program 118. RAM 110 typically contains data and/or program modules that are immediately accessible to and/or presently being operated on by CPU 102.

Computer system 100 may also include other removable/non-removable, volatile/nonvolatile computer media. By way of example, FIG. 1 illustrates a hard disk 120 that reads from or writes to non-removable, nonvolatile magnetic media, and a memory device 126 that may be an optical disk drive or a magnetic disk drive that reads from or writes to a removable, a nonvolatile storage medium such as an optical disk or magnetic disk. Other removable/non-removable, volatile/nonvolatile computer storage media that can be used in exemplary computer system 100 include, but are not limited to, magnetic tape cassettes, flash memory cards, digital versatile disks, digital video tape, solid state RAM, and solid state ROM. Hard disk drive 120 and memory device 126 may be connected to bus 122 through a storage path 124.

The disks and their associated computer media, discussed above and illustrated in FIG. 1, provide storage of computer-readable instructions, programmable code, data structures, program modules and other data for computer system 100. In FIG. 1, hard disk 120 is illustrated as storing an operating system (OS) 112, one or more applications 114, other programmable code 116, and a program 118. A user may enter commands and information into computer system 100 through an input device 132 such as a keyboard and mouse, trackball or touch pad tablet, electronic digitizer, or microphone. Other input devices may include a joystick, game pad, satellite dish, and scanner. These and other input devices are connected to CPU 102 through an input interface that is coupled to bus 122, but may be connected by other interface and bus structures, such as a parallel port, game port or a universal serial bus (USB). A display (GUI) 130 or other type of video device may also be connected to bus 122 via an interface, such as a video interface. In addition, an output device 134, such as speakers or a printer, may be connected to bus 122 through an output interface.

Computer system 100 may operate in a networked environment using a network 128 and a mobile device 136. Mobile device 126 may be used by any of administrators including marketing campaign developers as well as viewers or potential customers as discussed herein. Computer system 100 may also include a personal computer, a server, a router, a network PC, a peer device or other common network node. Mobile device 136 may include a handheld, tablet, or client device. Network 128 depicted in FIG. 1 may include a local area network (LAN), a wide area network (WAN), or other type of network. Such networking environments are commonplace in offices, enterprise-wide computer networks, intranets, and the Internet. In a networked environment, programmable code and application programs may be stored in remote computers. By way of example, FIG. 1 illustrates mobile instructions 138 as residing on mobile device 136. It will be appreciated that the network connections shown are exemplary and other means of establishing communication between computers and mobile device 136 may be used.

Figure 2:
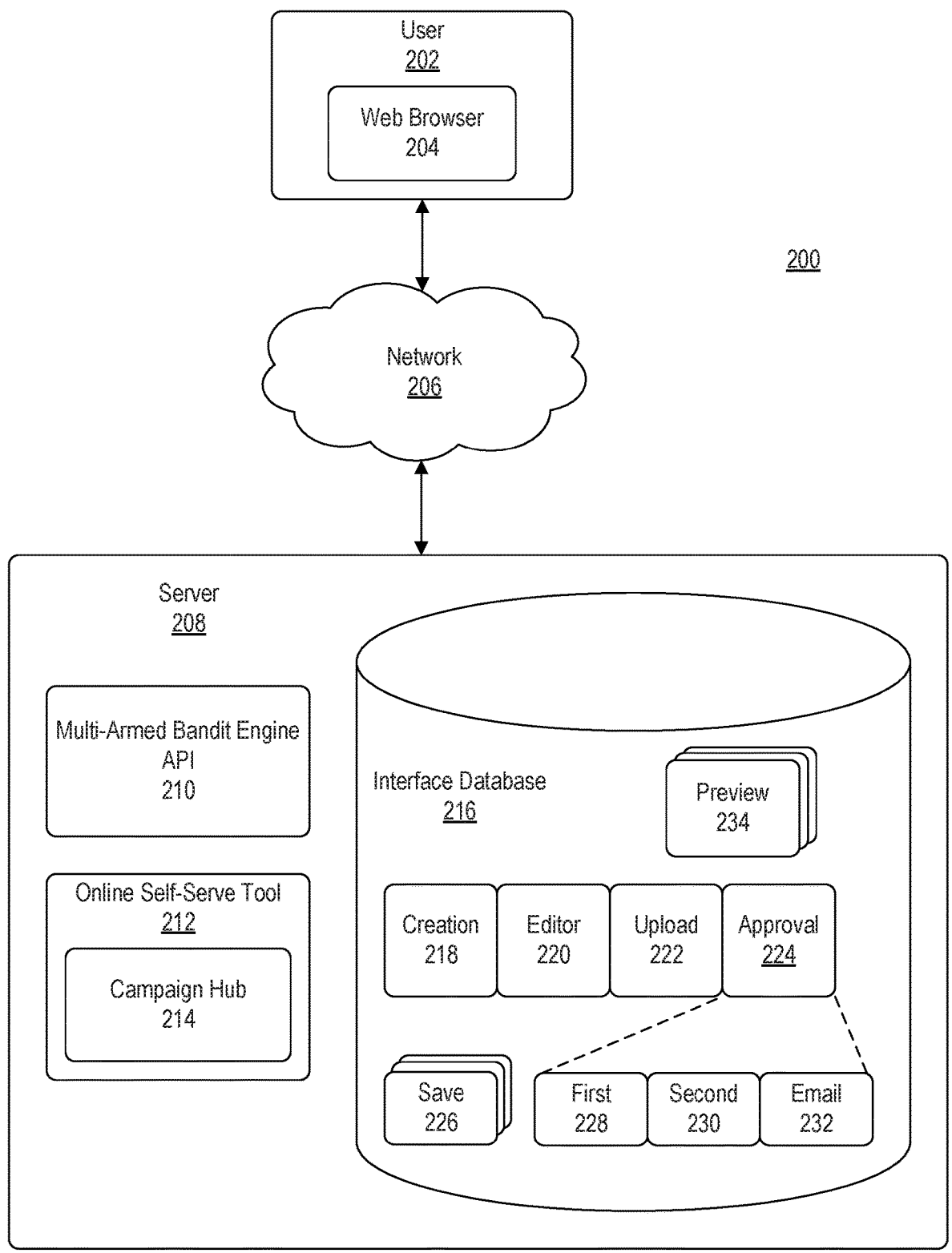
FIG. 2 is a block diagram representing an exemplary architecture of system components, consistent with disclosed embodiments.

Referring now to FIG. 2, there is shown a block diagram representing an exemplary architecture of system components, consistent with disclosed embodiments. In various embodiments, a user 202 operating computer system 100 or mobile device 136 may be operably coupled to one or more servers 208 by a network 206. Network 206 may be any type of network such as a local area network (LAN), a wide area network (WAN), or other type of network. A web browser 204 may execute on computer 100, and web browser 204 may include functionality for receiving data entered by user 202 as part of a self-serve tool consisting of a plurality of graphical user interfaces (GUIs). In general, web browser 204 may be any type of interpreted or executable software code such as a kernel component, an application program, a script, a linked library, an object with methods, and so forth.

Server 208 may be any type of computer system or computing device such as computer system 100 of FIG. 1. In general, server 208 may provide services for operating with a multi-armed bandit engine API 210 and an online self-serve tool 212. In particular, server 208 may include multi-armed bandit engine API 210 for analyzing webpages and serving a winning webpage. Server 208 may also communicate with online self-serve tool 212, which interacts directly with an online marketing campaign hub 214 (also shown in FIG. 3). Online self-serve tool 212 communicates with an interface database 216 to provide a series of GUI interfaces for user 202.

Interface database 216 may include a creation interface 218, an editor interface 220, an upload interface 222, and a plurality of approval interfaces 224. Approval interfaces 224 may include a first approval interface 228, a second approval interface 230, and an email interface 232. As discussed later herein, FIGS. 16-19 illustrate exemplary marketing campaign approval interfaces 224 for a self-serve tool of an online marketing campaign hub, consistent with disclosed embodiments. Server 208 may transmit first and second interfaces 228, 230 of approval interfaces 224 for approval and publication of web content. Server 208 may also transmit email interface 232 as an approval interface 224 (as shown in FIG. 17). Approval interfaces 224 may allow for a user to approve content before publishing of the content on a webpage.

Interface database 216 may also include multiple save interfaces 226 and multiple preview interfaces 234. Other interfaces (not shown) may be contemplated for display to user 202 and for interacting with online self-serve tool 212. Each of the interfaces and associated modules for displaying the interfaces may include any type of executable software code such as a kernel component, an application program, a linked library, an object with methods, or other type of executable software code.

User 202 may utilize one or more of the interfaces to customize a marketing and winning webpage experience. In collaboration with online self-serve tool 212, multi-armed bandit engine API 210 may select advertisements or webpages (e.g., a website landing page) that may result in a desired viewer interaction or engagement with a website and/or may maximize the total revenue from viewer clicks or based on other criteria.

Figure 3:
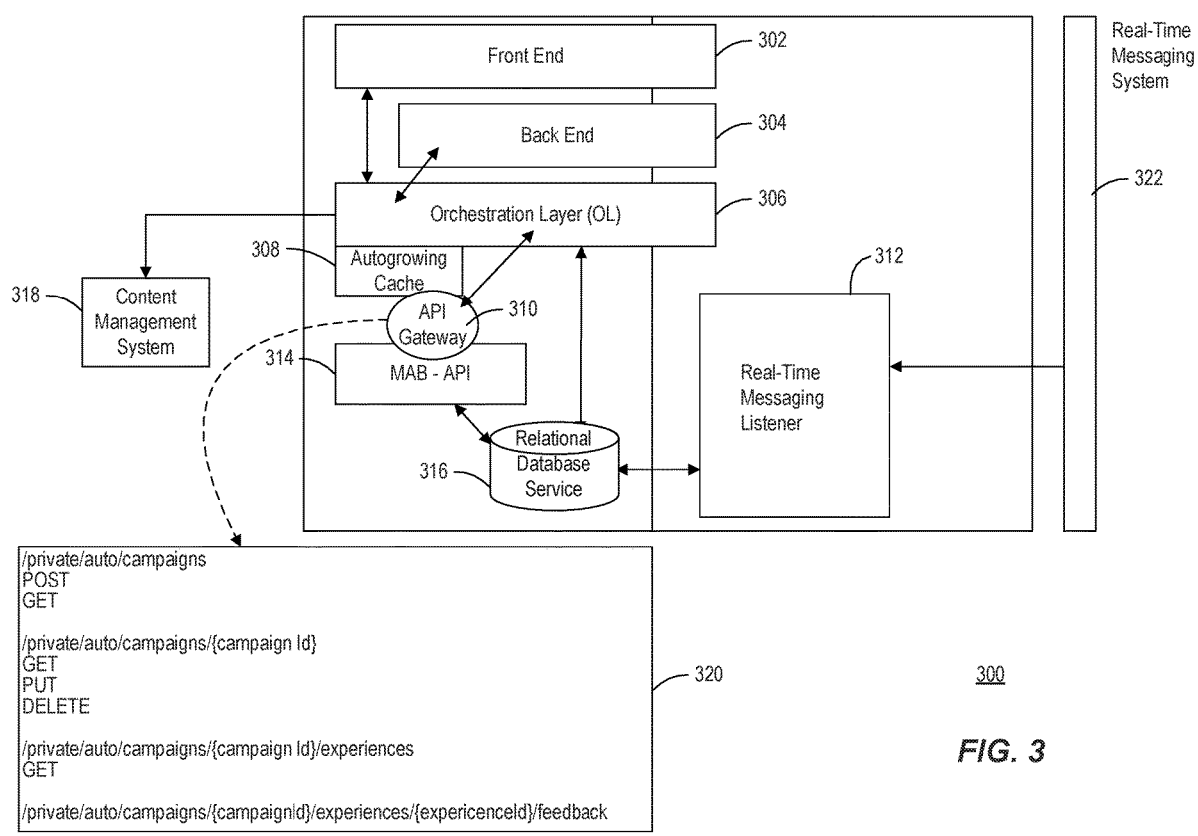
FIG. 3 is a block diagram representing an exemplary architecture of an online marketing campaign hub, consistent with disclosed embodiments.

FIG. 3 is a block diagram representing an exemplary architecture of an online marketing campaign hub 300, consistent with disclosed embodiments. As shown in FIG. 3, online marketing campaign hub 300 may include Front End 302 which may be external facing, and Back End 304 which may be internal facing. Front End 302 may include a front end or external-facing webpage experience shown to users or potential customers visiting webpages or winning webpages selected for their consumption. Back End 304 may include an internal-facing series of interfaces (as described with reference to FIG. 2 and online self-serve tool 212). Front End 302 and Back End 304 may communicate with an Orchestration Layer (OL) 306 and an Autogrowing Cache 308. Autogrowing Cache 308 may include a cache that is expandable. OL 306 may include a component that is responsible for orchestration of Application Programmable Interface (API) calls. OL 306 may include multiple functionalities including a functionality to deliver information requested by an API client. When an API client requests information, OL 306 may reach out and communicate with systems or sub-systems to gather information for sending to a requesting API client.

As shown in FIG. 3, OL 306 services Front End 302 and Back End 304 by gathering information from other sub-systems (or micro-components) such as Autogrowing Cache 308, API Gateway 310, Relational database service 316, and Content Management System 318. Relational database service 316 may simply include a database that is configured to store data and receive and transmit data. Relational database service 316 may receive communication from Real-Time Message Listener 312. Real-Time Message Listener 312 may receive communication relating to customer application activity, including for example, content relating to "Pre-qualify-Application," "Loan Application," and "Loan Funded" or activities relating to financial transactions. Real-Time Message Listener 312 may then clean data it receives relating to financial transaction customer application activity and may then push that data to database 316 for further learning. Other customer application activity or events may be contemplated. Autogrowing Cache 308 may include a data store and cache service relied upon by both Front End 302 and Back End 304. OL 306 may also communicate with a content management system (CMS) 318. OL 306 may communicate with CMS 318 to store and retrieve web content such as dynamic texts, images, and icons. Other content may be stored and retrieved. CMS 322 may include a repository of content relating to financial, transaction, or other related information as displayed in relation to interfaces 218-234 (as shown in FIG. 2).

As discussed above, a media platform for development, such as an API Gateway 310, may operate as a pass through and auto-discovery of registered APIs. Communication may occur from OL 306 and MAB-API 314 via API Gateway 310. On API Gateway 310, API endpoints are registered for a client API to access. Specifically, a list of operations 320 lists some of the endpoints that are registered on the API gateway 310. The endpoints are required to be registered on API Gateway 310 before any of API clients may consume information. Consuming an API may include, for example, making a call to an API and consuming information returned by an API.

As shown in FIG. 3, a list of operations 320 registered on the API gateway may be executed to retrieve information and display creatives relating to marketing campaign webpages and content. Only the list of operations 320 registered on the gateway are accessible for the clients. For example, list of operations 320 may include the following API commands or endpoints: "/private/auto/campaigns," "POST," and "GET;" "/private/auto/campaigns/{campaign Id}," "GET," "PUT," and "DELETE;" "/private/auto/campaigns/{campaign Id}/experiences" and "GET;" and "/private/auto/campaigns/{campaign Id}/experiences{experienceId}/feedback." These commands or operations indicate post, get, put, and delete operations by API Gateway 310 to retrieve information and/or display creatives and get experience feedback relating to marketing campaign webpages and content. Other operations not shown in FIG. 3 may be contemplated. API Gateway 310 may implement list of operations 320 registered on API Gateway 310.

Multi-Armed Bandit-Application Program Interface (API) 314 (also identified as 210 in FIG. 2) provides reinforcement learning. Multi-Armed Bandit API 314 may include an objective (e.g. delivering a "winning" webpage, etc.). Multi-Armed Bandit API 314 may include predetermined rules or may develop rules. Once those rules are specified and finalized, reinforcement learning algorithms may play a "game" multiple times to find a best strategy to "win" or deliver a "winning" webpage. Here, Multi-Armed Bandit API 314 may communicate with a Relational Database Service (RDS) 316 to provide data. Real-Time Messaging Listener 312 may initiate communication with RDS 316. Real-Time Messaging Listener 312 may also communicate with a Real-Time Messaging System 322. Other components and communication operations may be contemplated as part of online marketing campaign hub 300.

In some embodiments, online marketing campaign hub 300 may aim to acquire new customers by running campaigns, which may serve a set of creative assets to a group of viewers (e.g., customers, potential customers). These assets may be paid advertisements, or may be entirely search based Online marketing campaign hub 300 may be launched for search engine marketing (SEM). In SEM, online marketing campaign hub 300 may target users based on what search terms they type into a search engine such as Google (i.e. "prequalify for auto financing", "auto financing options", etc.). The set of creatives used in SEM constitute landing pages which users may see on Front End 302 when they click a paid search ad. Online marketing campaign hub 300 may define each creative in the set, and system 100 may execute a recommendation algorithm to determine in real-time based on on-going campaign performance which creative to show to a user.

The recommendation algorithm may include multiple landing pages and experiences based on which page delivers the most business. When a customer clicks on any button included on any of the landing pages, the recommendation algorithm may provide a loopback and indicate a status of "success." Before the customer clicks on a webpage button, the landing page is marked as a status of "failure." However, when the customer clicks on any button, the "failure" status is neutralized and a "success" flag is added to the landing page. The recommendation algorithm continually employs the process of showing a page, marking the experience as a default "failure," waiting for "success" before user interaction, marking as "success" based on user interaction, and then showing a webpage repeatedly. As this process is performed, the recommendation algorithm determines the "winning webpage" (and other "losing" webpages) that yields the maximum rewards. This determination may be based on Thompson Sampling.

As an example, additional details relating to Thompson Sampling may be found in the publication by Daniel J. Russo, Benjamin Van Roy, Abbas Kazerouni, Ian Osband and Zheng Wen (2018), A Tutorial on Thompson Sampling, Foundations and Trendsein Machine Learning: Vol. 11: No. 1, pp 1-96. https://www.nowpublishers.com/article/Details/MAL-070

In some embodiments, the recommendation algorithm may be based on a Thompson Sampling to determine which creative eliciting an experience should be shown to customers. System 100 may execute the recommendation algorithm to determine and serve a winning webpage. The recommendation algorithm may allow for choosing an action that maximizes an expected reward. As discussed below, the reward may be selected with respect to a likelihood function. The elements of the recommendation algorithm may include a set of parameters, a prior distribution of the set of parameters, observations, and a posterior distribution, as further discussed below. Online marketing campaign hub 300 may use these and other features of the recommendation algorithm to identify and present a "winning" webpage. The recommendation algorithm may help determine a "winning webpage" based on actual metrics that campaign hub 300 is collecting and based on user interactions in real-time (e.g. number of clicks, button selections, etc.).

In some embodiments, the recommendation algorithm may include a set of contexts X, a set of web pages $\mathcal{A}$, and rewards in $\mathbb{R}$. In each webpage recommendation, system 100 may obtain a context x∈X, may recommend a webpage $a \in \mathcal{A}$, and may receive a reward $\tau \in \mathbb{R}$ following a distribution. The distribution may depend on the contexts X, and the issued webpage. System 100 may recommend one or more webpages in order to maximize rewards.

An embodiment implementing the recommendation algorithm may include:
1. a likelihood function P(τ|θ,α,x);
2. a set Θ of parameters θ of the distribution of τ;
3. a prior distribution P(θ) on these parameters;
4. past observations triplets $\mathcal{D} = \{(x;a;\tau)\}$; and
5. a posterior distribution $P(\theta|\mathcal{D}) \propto P(\mathcal{D}|\theta)P(\theta)$, where $P(\mathcal{D}|\theta)$ constitutes the likelihood function.

Versions or variations of the recommendation algorithm may include sampling in multiple rounds and may include recommending a webpage $a \in \mathcal{A}$ according to the probability that maximizes the expected reward, i.e.

$$\int \mathbb{I}\left[\mathbb{E}(\tau \mid \alpha^*, x, \theta) = \max_{\alpha'} \mathbb{E}(\tau \mid \alpha', x, \theta)\right] P(\theta \mid \mathcal{D}) d\theta,$$

where $\mathbb{I}$ is the indicator function.

Consistent with this disclosure, a recommendation algorithm may include sampling in multiple rounds, parameters θ* from the posterior $P(\theta|\mathcal{D})$, and choosing the action α* that maximizes $\mathbb{E}[\tau|\theta^*, \alpha^*, x]$, i.e. the expected reward given the sampled parameters, the webpage and the current context. Consistent with this disclosure, system 100 may reward a particular webpage that was successfully able to receive user input (e.g. a click) from a user or customer. As discussed above, system 100 may mark one or more experiences as a default "failure," wait for "success" before user interaction (e.g. a click), mark the experience as a "success" based on the user interaction, and then show a winning webpage $a \in \mathcal{A}$ repeatedly. As this process is performed, the recommendation algorithm may determine the winning webpage $a \in \mathcal{A}$.

Figure 4:
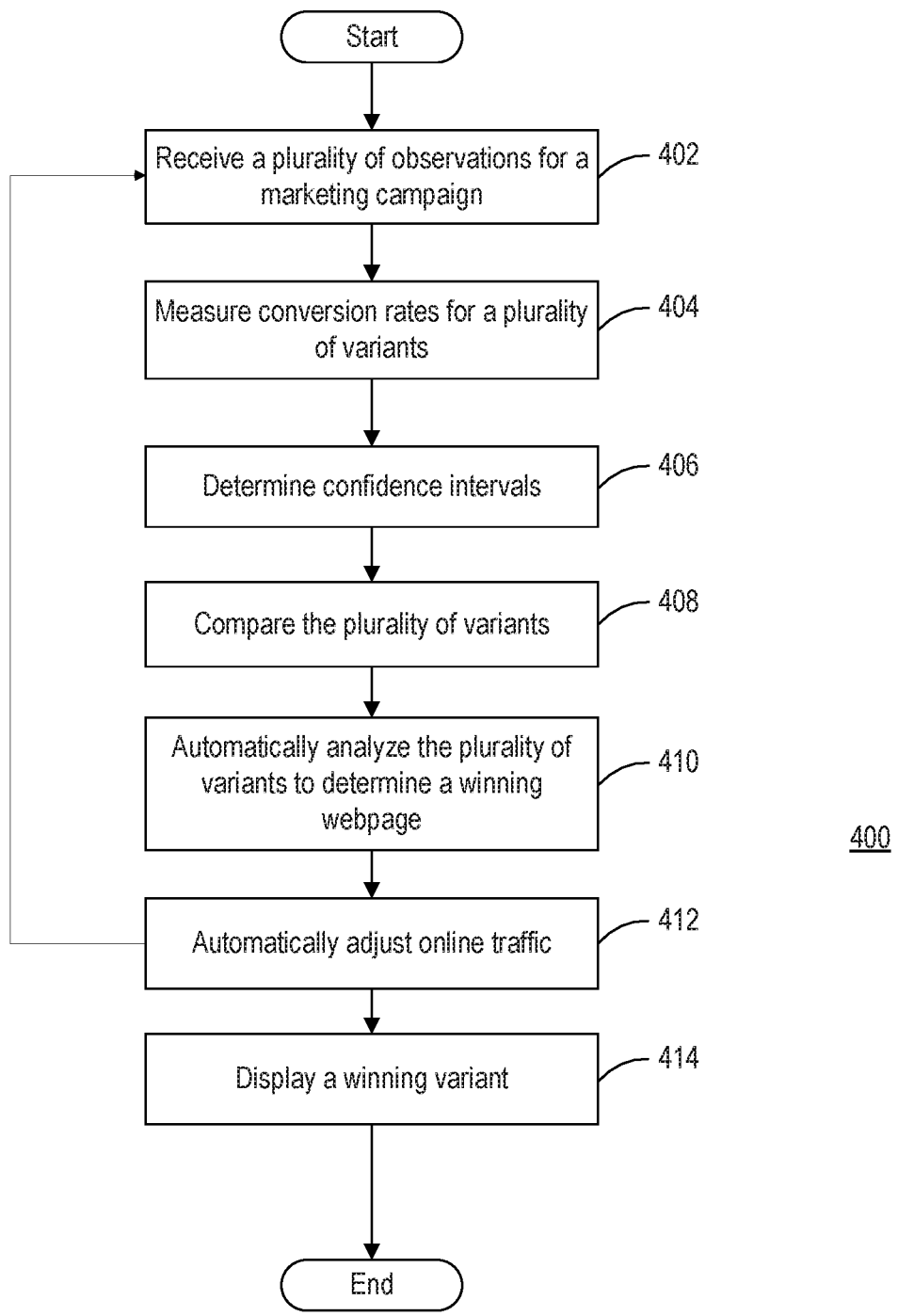
FIG. 4 is an exemplary flow chart illustrating an exemplary first marketing process, consistent with disclosed embodiments.

Referring now to FIG. 4, there is shown a flow chart of an exemplary first marketing process 400, consistent with disclosed embodiments. In some embodiments, first exemplary marketing process 400 may be executed by a computer system 100 in communication with a multi-armed bandit engine API 210, server 208, and online marketing campaign hub 300 to determine a winning webpage or winning variant.

At step 402, multi-armed bandit engine API 210 may interact with computer system 100 and may receive a plurality of creatives of a webpage for a marketing campaign, the marketing campaign comprising a presentation published to a viewer and resulting in a viewer experience. The creatives may include a plurality of advertisements, portions of webpages, or landing pages selected for observation and further analysis, consistent with disclosed embodiments. The campaign may include a recommendation algorithm that determines a landing page dynamically within the campaign. A campaign may be directed to any subject area, such as financing cars. For example, a campaign directed to financing cars may receive a plurality of car financing creatives and may implement a recommendation algorithm that determines a car financing landing page dynamically. The may include a number of associated views by viewers that exceed a minimum first threshold, and a plurality of new observations associated with a new marketing campaign may exceed a minimum second threshold. The first and second thresholds may be indicative of a minimum number of views or observations by a viewer required to accurately render an assessment of the effectiveness of advertising of observed webpages. In particular, a minimum number of views may be required for a large enough sample size to yield an accurate measurement of conversion rates based on clicks for a plurality of variants of a marketing campaign.

For example, a threshold level number of observations or views may include 10, 1000, or even 10,000 views of webpages selected for further analysis. Other observational threshold values may be contemplated. Alternatively, no minimum number of observations may be required. Additionally, in some aspects, the more observations that are received, the more accurate the resulting analysis pertaining to calculating conversion rates is, as discussed above.

At step 404, multi-armed bandit engine API 210 may interact with computer system 100 and may measure, based on the user experience, a result including conversion rates for a plurality of variants of the marketing campaign, the variants including webpages. While variants typically refer to webpages, variants could constitute other types of digital interfaces (e.g. GUIs). Measured conversion rates may include measuring a percentage of website viewers that purchase a product from webpages of the marketing campaign. In other embodiments, the measured conversion rate may include a percentage number of website visitors in comparison to related websites or a percentage value of website visitors that execute a threshold number of clicks on a particular webpage. Other measured conversion rates may be contemplated.

As part of the measuring process, the recommendation algorithm may be leveraged as a way of identifying which webpage to exploit and explore as a sub-algorithm or a subset of steps. The recommendation algorithm may also perform steps including showing a webpage, marking an experience (resulting from the webpage) as a failure, and measuring precise data input such as clicks or button selections, and subsequently measuring, based on the viewer experience, a result including conversion rates. Based on the precise data input and conversion rates, the recommendation algorithm may mark the experience as a "success", and then may display the webpage, as discussed below. Multi-armed bandit engine API 210 may repeat this process until the recommendation algorithm learns which webpage yields the maximum rewards and is determined to be the "winning" webpage. Multi-armed bandit engine API 210 may implement the recommendation algorithm to determine confidence intervals and compare variants, as discussed below, in order to determine a "winning" webpage, as discussed below.

At step 406, multi-armed bandit engine API 210 may interact with computer system 100 and may determine confidence intervals in association with measured conversion rates as part of exploiting and exploring webpages, as discussed above. For instance, multi-armed bandit engine API 210 may use the recommendation algorithm based on Thompson Sampling as a way of determining confidence levels. Confidence intervals may include a range of values defined such that there exists a probability threshold that indicates a value of the measured conversion rate lies within the range. For example, a 95% confidence interval results in 95% confidence (or probability) that the range of values contains or includes the data of the dataset. Consistent with the disclosed embodiments, 95% confidence intervals may be calculated, but other confidence interval values may be contemplated and calculated. 95% confidence intervals and other confidence intervals may be calculated and determined based on measured conversion rates for observed webpages associated with a marketing campaign.

At step 408, multi-armed bandit engine API 210 may interact with computer system 100 and may compare received creatives, measured conversion rates of webpages containing these creatives based on a number of clicks, and determined confidence intervals of a plurality of variants of creatives. A predefined threshold may be calculated based on a received creatives, a measured conversion rate, and a confidence interval. The predefined threshold may be used for the comparison. The predefined threshold may serve as a cut-off point for comparing the measured conversion rates and the determined confidence intervals for the creative variants. Multi-armed bandit engine API 210 and computer system 100 may compare received creatives, measured conversion rates, and determined confidence intervals in accordance with varied calculated functions.

At step 410, multi-armed bandit engine API 210 may interact with computer system 100 and may automatically analyze, based on the comparison, the creative variants to determine a "winning" webpage. The comparison may automatically compare received creatives, measured conversion rates, and determined confidence variants to determine a "winning" webpage. In particular, multi-armed bandit engine API 210 may perform exploitation and exploration steps including showing a webpage, marking an experience as a failure, and waiting for precise data input such as clicks or button selection by a viewer. Based on the precise data input, the recommendation algorithm may compare webpages and mark the experience as a success, and then may show the webpage. The recommendation algorithm may repeat this process until the multi-armed bandit engine API 210 compares and learns which webpage yields the maximum rewards and is determined to be the "winning" webpage. Additionally, the recommendation algorithm also explores the "losing pages." In practice, a user may not receive a "winning page," but instead, may receive a different page as part of the "exploration" of the recommendation algorithm. This page may be a "losing" webpage even though it received a high number of clicks or button selections.

In contrast with A/B testing, where a campaign distribution is typically fixed (e.g. 2000 total impressions with 1000 impressions of variant A and 1000 impressions of variant B and then selecting the winner), the analysis in step 410 yields certain advantages. For example, in the example embodiments, there is not a fixed distribution, and the distribution is changing based on received results. Therefore, organically the "winning page" may win out. However, multi-armed bandit engine API 210 may receive more nuanced results by forcing exploration of the other pages (e.g. exploration can help identify if certain variants are more successful with certain types of viewers, even if particular webpage variants may be considered "losing pages"). Other advantages of the example embodiments may be contemplated.

Furthermore, rather than performing A/B testing results to merely determine web pages providing a winning experience or set of experiences, and then adjusting the flow of online or web traffic so that the winning webpages may be displayed to users at a higher rate over time, multi-armed bandit engine API 210 performs an improved automated algorithm. This may include an algorithmic exploration phase and an exploitation phase to perform a comparison and determine, in real-time, which webpage to send to the viewer which may or may not be a winning webpage. This winning webpage may change over time in accordance with a change in a number of received creatives, changes in resulting conversion rates based on viewer experiences, and changes in confidence intervals.

Multi-armed bandit engine API 210 and computer system 100 may also determine a winning webpage based on a highest measured conversion rate and a highest confidence interval. The winning webpage may have a highest measured conversion rate and a highest confidence interval in comparison with the other webpages under observation. Alternatively, the winning webpage may include only one of a highest measured conversion rate and a highest confidence interval. Other means for analyzing and determining a winning webpage may be contemplated. For example, multi-armed bandit engine API 210 may rank multiple webpage variants, and the higher the rank, the more frequently a winning webpage will appear. If there are webpages with three different creatives in a marketing campaign, these three webpages may be respectively served to three viewers, and if a first viewer clicks on a button of the respective webpage, then the rank of an experience associated with that webpage may be increased. As a result, for a subsequent viewing experience, there is a higher probability that the webpage associated with the clicked button may be displayed. However, consistent with the disclosed embodiments, multi-armed bandit engine API 210 may perform exploration of webpages that includes testing of "losing" webpages to try to attain maximum rewards there as well.

At step 412, computer system 100, multi-armed bandit engine API 210 of server 208, and online marketing campaign hub 300 may automatically and/or in real-time adjust online traffic such that the winning webpage is displayed more frequently than other webpages. Adjusting online traffic may include adjusting of online webpages served to viewers. Adjusting online traffic may occur in real-time (not just automatically) for each new viewer, and the determination of which webpage any viewer will see as a landing page may change based on preceding interactions. For instance, for each new viewer, the determination of which webpage any viewer will see as a landing page may or may not change based on some preceding viewer interactions. Other methods for adjusting online traffic based on preceding interactions may be contemplated.

As discussed above, based on viewer interaction, a ranking of a webpage may be increased resulting in a higher probability that the webpage may be viewed as a landing page. As another example, display (GUI) 130 in combination with output device 134 and mobile device 136 may display the winning webpage to the exclusion of other webpages potentially provided for observation. Indeed, mobile device 136 may also allow for the winning webpage to be displayed in a display (GUI) tailored to the output display dimensional constraints of a mobile device for observation by a viewer, and the winning webpage may be displayed as part of a downloadable software application configured exclusively for a mobile phone. Other capabilities and new applications may be configured for mobile device 136 in order to enhance identification and display of winning webpages. Alternatively, display (GUI) 130 in combination with output device 134 and mobile device 136 may display the winning webpage at a higher rate than other webpages. Mobile device 136 may display the winning webpage at a rate acceptable for display in accordance with software application instructions. This rate may be linear or geometric such that the frequency with which the winning page is displayed increases exponentially. Other processes for automatically adjusting online traffic are contemplated. For example, multi-armed bandit engine API 210 and computer system 100 may receive a plurality of new creatives for a new marketing campaign or as part of the existing marketing campaign, and multi-armed bandit engine API 210 and computer system 100 may adjust web traffic to display these webpages alongside the winning webpage.

In some embodiments, measured new conversion rates may include a measured percentage of website visitors that purchase a product on webpages of the marketing campaign. In other embodiments, a measured new conversion rate may include a percentage number of website visitors in comparison to related websites or a percentage value of website visitors that execute a threshold number of clicks on a particular webpage. Other measured new conversion rates may be contemplated.

At step 414, multi-armed bandit engine API 210 may display in a GUI (as discussed above) or output a winning variant corresponding to a new winning webpage based on measured conversion rates. Multi-armed bandit engine API 210 may execute a recommendation algorithm based on Thompson Sampling, and display the winning webpage. Processor 102 may be configured to display the winning webpage on a graphical user interface of mobile client device 136. Winning webpage results may be used within an existing marketing campaign. For example, winning webpages may be displayed to influence the results of other marketing campaigns. Other means of display of "winning" (or "losing") webpages may be contemplated.

Figure 5:
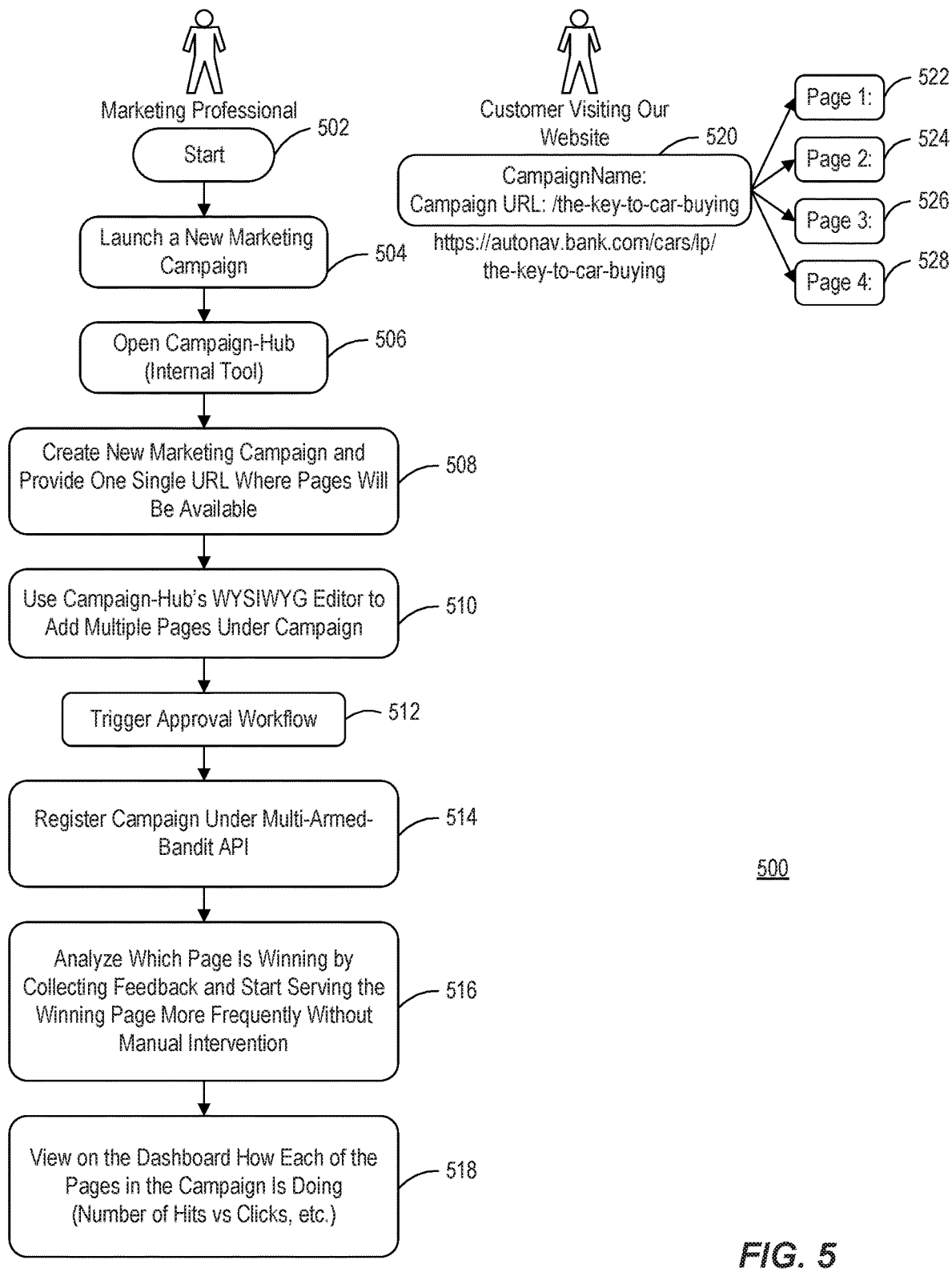
FIG. 5 is an exemplary flow chart illustrating an exemplary second marketing process, consistent with disclosed embodiments.

Referring now to FIG. 5, there is shown a flow chart of an exemplary second marketing process 500, consistent with disclosed embodiments. In some embodiments, second exemplary process 500 may be executed by user (marketing professional) 202 with computer system 100, server 208, and online marketing campaign hub 300 to determine one or more winning webpages or winning variants. In particular, exemplary second marketing process 500 involves user 202, at step 502, beginning the second marketing process by using an online self-serve tool 212 (as illustrated in FIGS. 6-26). As shown in FIG. 5, a viewer (potential customer) visiting an external website 520 may be directed to one or more of multiple "winning" or "losing" webpages including, for example, "page 1" 522, "page 2" 524, "page 3" 526, and "page 4" 528, resulting from second marketing process 500.

Figure 6:
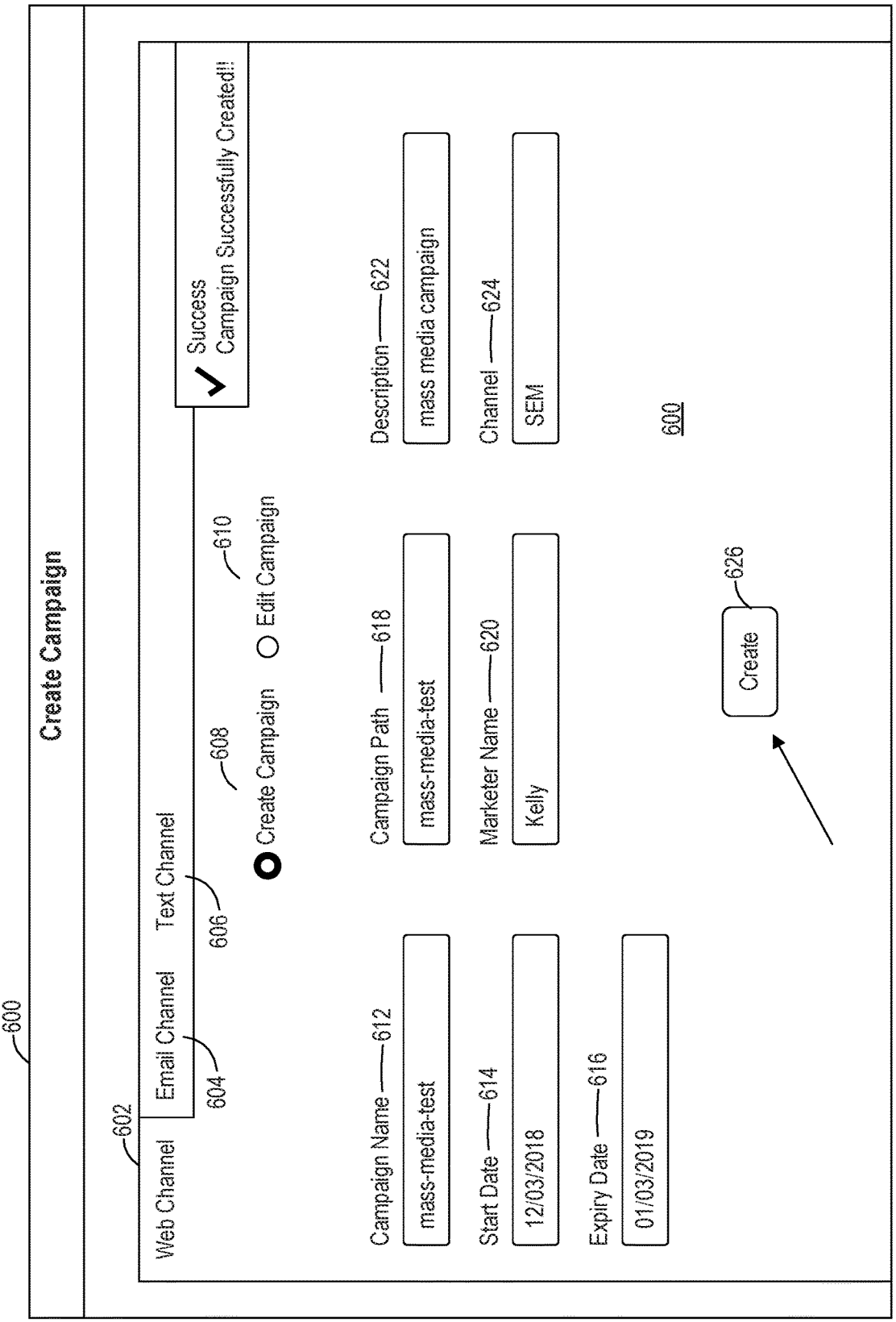
FIG. 6 is an illustration representing an exemplary marketing campaign creation interface for a self-serve tool of an online marketing campaign hub, consistent with disclosed embodiments.

At step 504, computer system 100 may receive an input request to launch a new marketing campaign. The input request may be an instruction or entry from user (e.g. a marketing professional) 202 (FIG. 2) into one or more interfaces. At step 506, user 202 may interact with interfaces generated by computer system 100 to open, based on the request, an online campaign hub interface 600 (as shown in FIG. 6). At step 508, user 202 may interact with interfaces generated by computer system 100 to create, based on online marketing campaign hub 300, a single URL or website that indicates the location of webpages associated with a new marketing campaign.

FIG. 6 is an exemplary illustration representing a marketing campaign creation interface for a self-serve tool of an online marketing campaign hub, consistent with disclosed embodiments. As shown in FIG. 6, a user may enter a "Create Campaign" interface 600 of an online self-serve tool and may select a URL or "Web Channel" tab 602. Other tabs relating to an "Email Channel" 604 and "Text Channel" 606 are shown in FIG. 6.

A user may select a "Create Campaign" radio dial button 608, and may select an "Edit Campaign" radio dial button 610. A user may insert a "Campaign Name" 612, a "Start Date" 614, an "Expiry Date" 616, a "Campaign Path" 618, a "Marketer Name" 620, a "Description" 622, and a "Channel" 624. As shown in FIG. 6, once the user is ready to create the new marketing campaign, he or she may click the "Create" button 626. The new marketing campaign may be created based on the data entered by the user.

Figure 7:
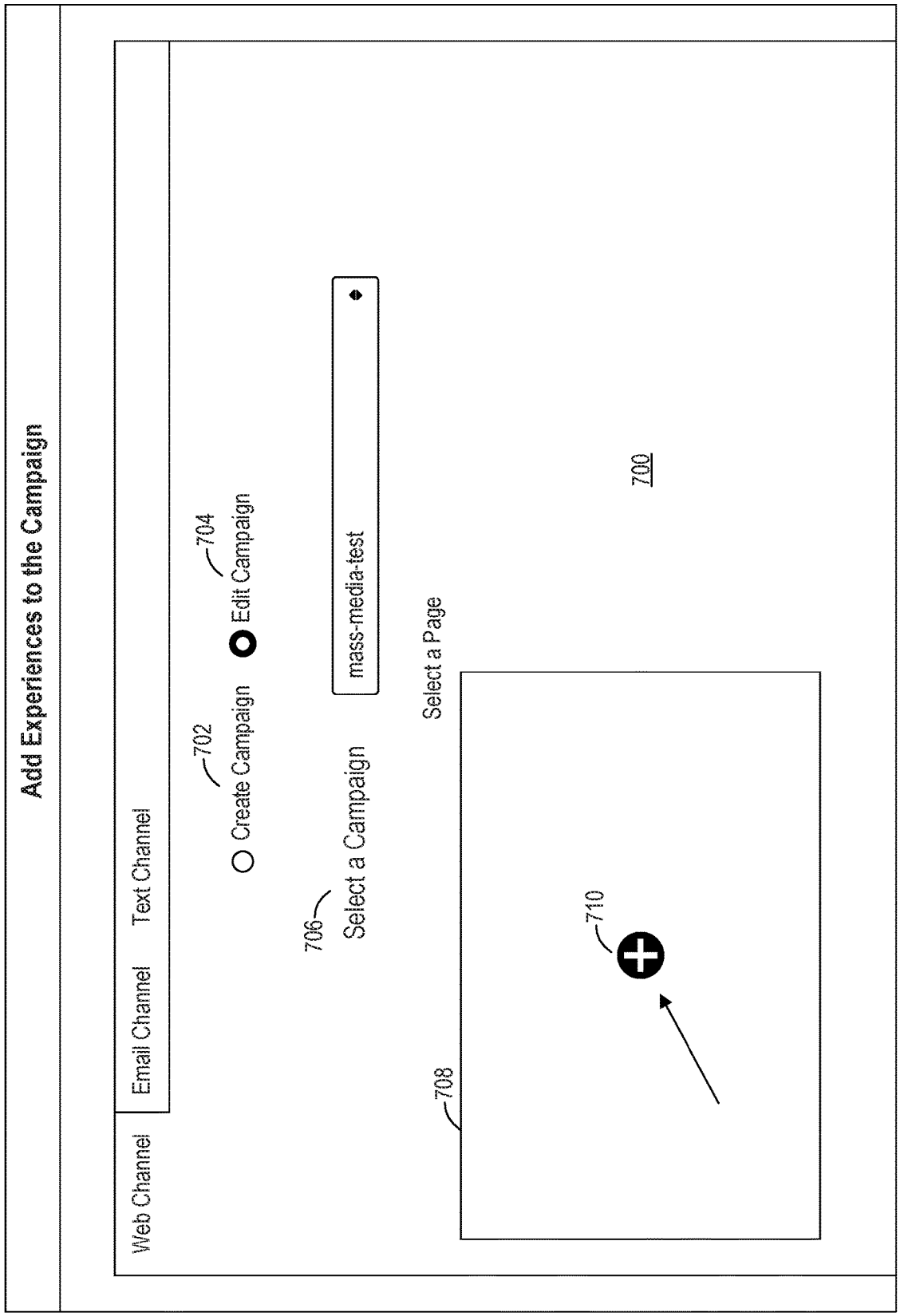
FIG. 7 is an illustration representing an exemplary marketing campaign editor interface for a self-serve tool of an online marketing campaign hub, consistent with disclosed embodiments.

FIG. 7 is an exemplary illustration representing a marketing campaign editor interface for a self-serve tool of an online marketing campaign hub, consistent with disclosed embodiments. As shown in FIG. 7, a user interacts with "Add Experiences to the Campaign" interface 700. A user may toggle from "Create Campaign" 702 and click the "Edit Campaign" radio dial button 704 or may also choose "Select a Campaign" 706 from a drop down menu to edit a campaign. As shown in FIG. 7, the user may choose "Select a Page" 708 and may click a plus (+) icon 710 to add webpages to the campaign. A user or user may add existing webpages to an ongoing marketing campaign.

Returning to FIG. 5, at step 510, user 202 may interact with interfaces generated by computer system 100 to add, based on an editor, second webpages to the location of the first webpages. The editor may be a "What you see is what you get" (WYSIWYG) editor, although other types of editors may be contemplated.

Figure 8:
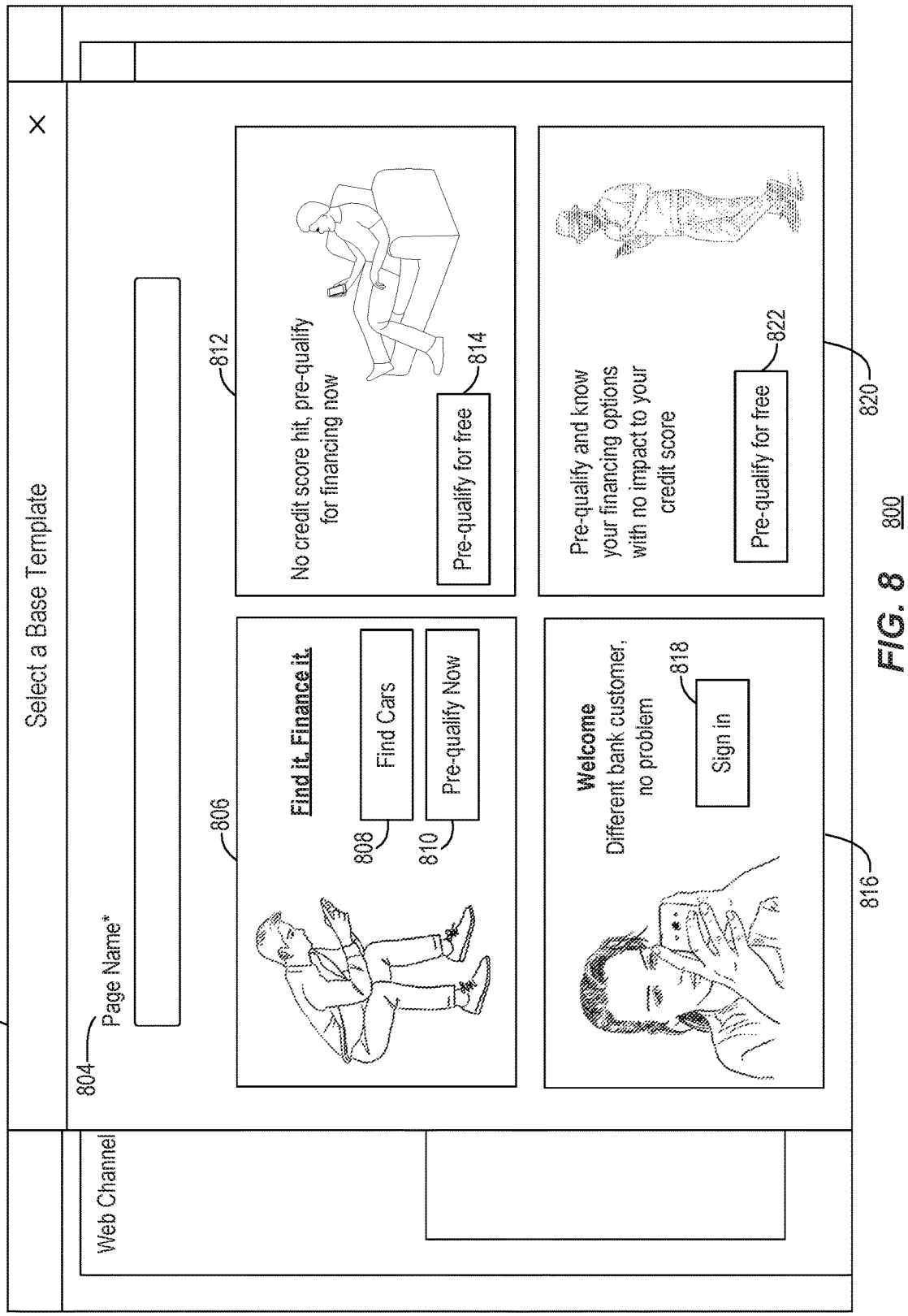
FIGS. 8-9 are illustrations representing exemplary marketing campaign base template interfaces for a self-serve tool of an online marketing campaign hub, consistent with disclosed embodiments.
Figure 9:
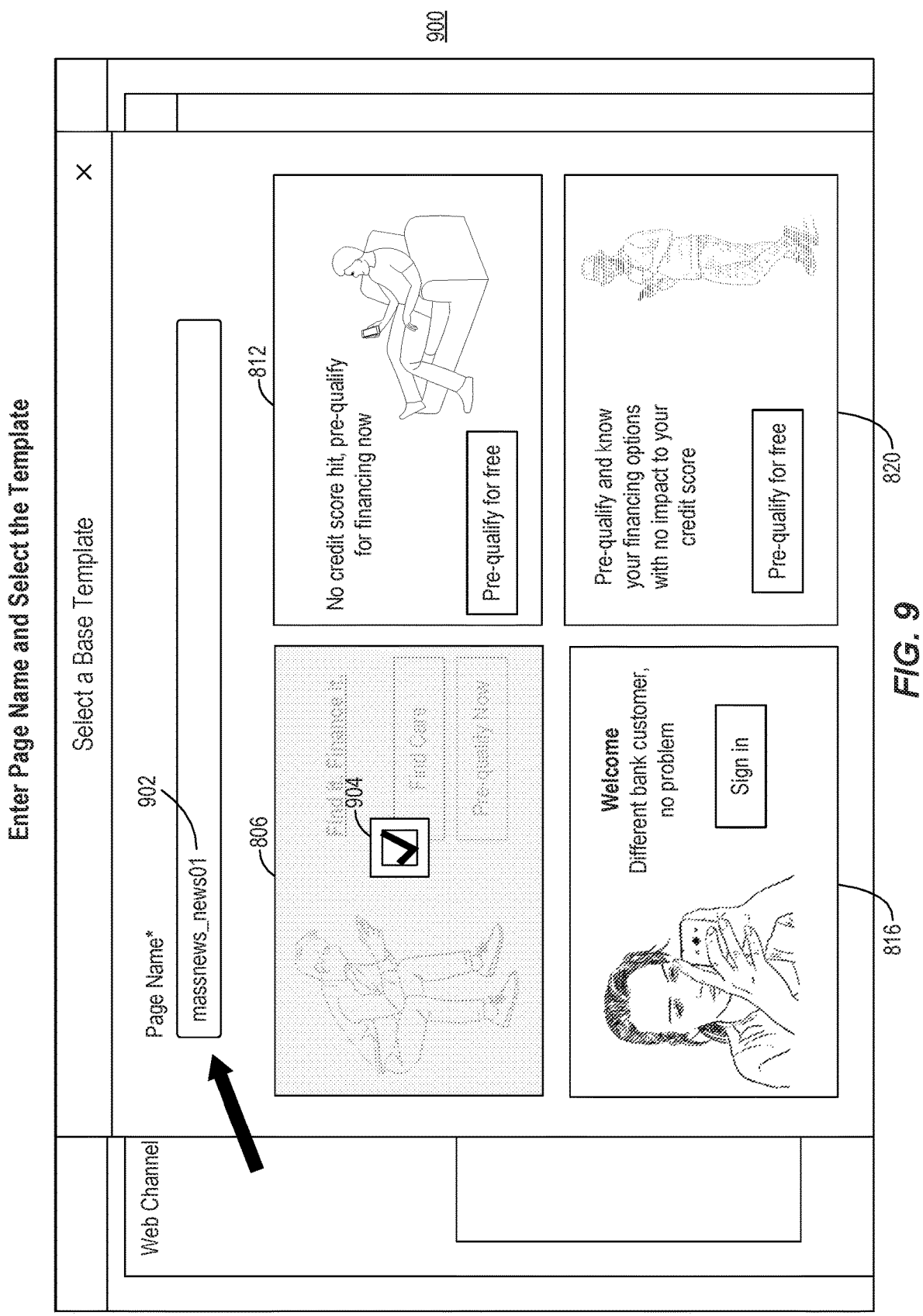

FIGS. 8-9 are exemplary illustrations representing marketing campaign base template interfaces for a self-serve tool of an online marketing campaign hub, consistent with disclosed embodiments. As shown in FIG. 8, a user may engage an interface 800 and a window 802 to "Enter a Page Name" and "Select a Base Template" to add a webpage. As shown in FIG. 8, the user may type a page name in a text field 804, and may select one of templates 806, 812, 816, and 820 (each including different text and graphics). Templates 806, 812, 816, and 820 may include different buttons. For example, template 806 may include a "Find Cars" 808 and "Pre-qualify Now" button 810. Templates 812 and 820 may include buttons stating "Pre-qualify for Free" 814, 822. Template 816 may include a "Sign in" button 818. Other buttons may be contemplated, and templates may include different and customizable textual content. For example, base template 806 includes the text "Find it. Finance It." Algorithms may also be contemplated based on the number of user 202 clicks on "Pre-qualify for Free" 814, such that algorithms may learn from feedback based on the number of user 202 clicks. A feedback loop may allow the customer to apply for or pre-qualify for a loan.

Base template 816 may include the text "Welcome" and "Different bank customer, no problem". Base template 812 may also include the text "No credit score hit, pre-qualify for financing now." Base template 820 may further include "Pre-qualify and know your financing options with no impact to your credit score." Base templates may be clustered or segmented for different bank customers and a campaign may be applied to a particular segment (e.g. different bank customers). Text may be displayed based on the particular segment applied of a marketing campaign. Other base templates and corresponding segmentation may be contemplated.

As shown in FIG. 9, a user enters a page name in an interface 900, the page name being, for example, "mass-news_news01" 902, and selects the top left base template 806 as indicated by the check mark 904. Other base templates may be selected.

Figure 10:
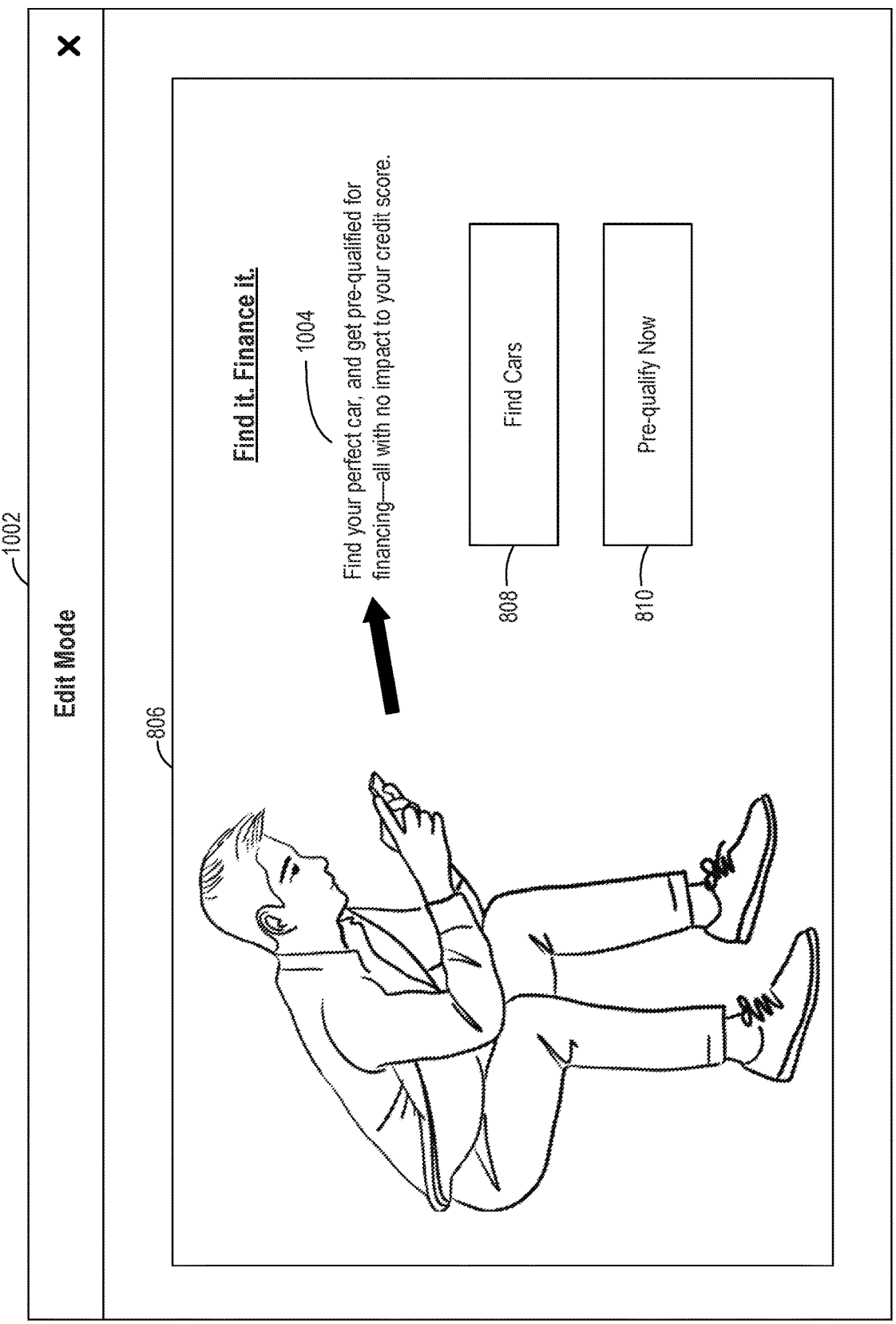
FIG. 10 is an illustration representing an exemplary marketing campaign edit mode interface for a self-serve tool of an online marketing campaign hub, consistent with disclosed embodiments.

FIG. 10 is an illustration representing an exemplary marketing campaign edit mode interface for a self-serve tool of an online marketing campaign hub, consistent with disclosed embodiments. As shown in FIG. 10, a user may interact with an "Edit Mode" interface 1000 and a window 1002 to edit textual content 1004, as presented in the selected top base template 806. For example, under "Find It. Finance It," user may select "Find your perfect car, and get pre-qualified for financing—all with no impact to your credit score" 1004 for subsequent editing as discussed with reference to FIG. 11.

Figure 11:
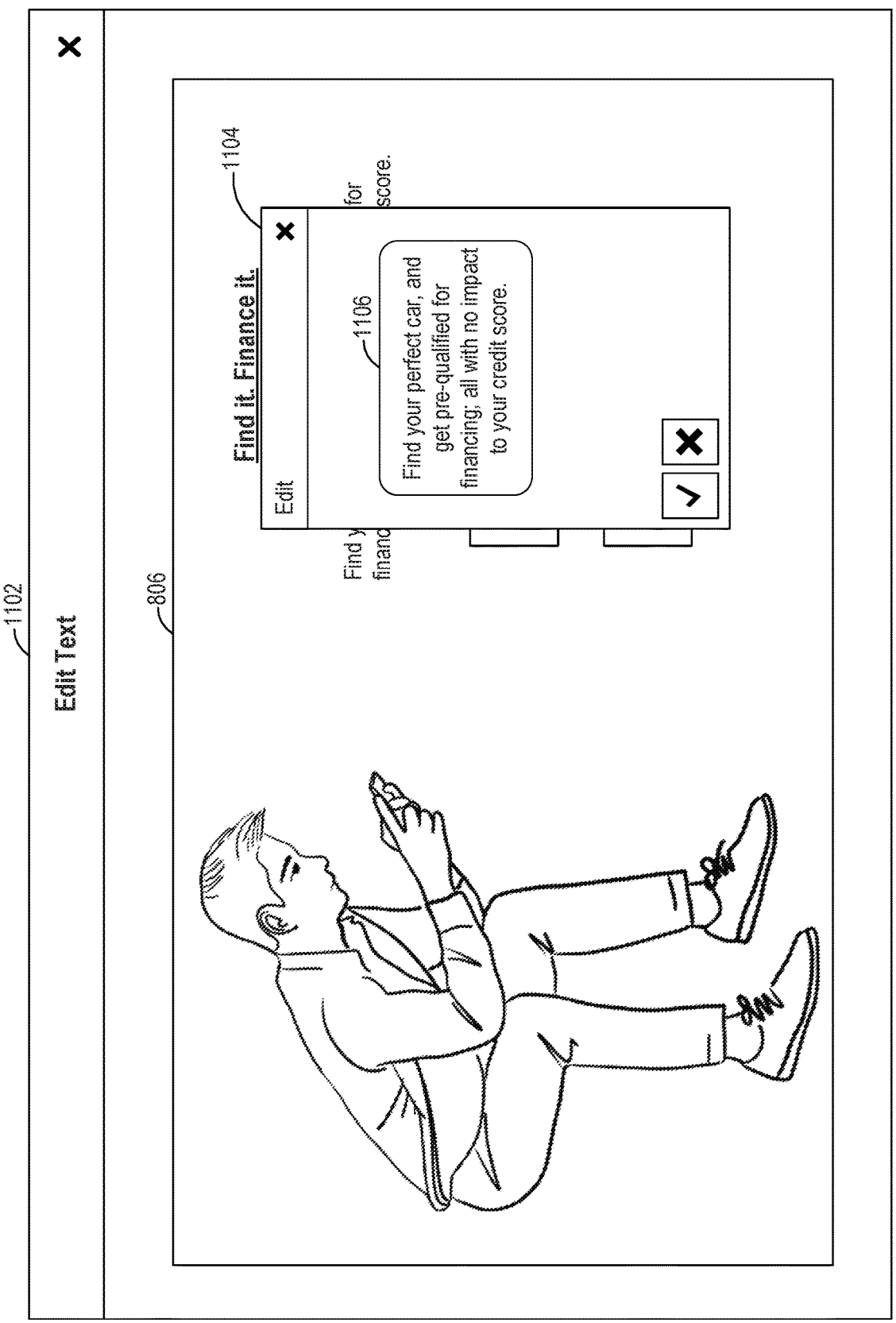
FIG. 11 is an illustration representing an exemplary marketing campaign edit text interface for a self-serve tool of an online marketing campaign hub, consistent with disclosed embodiments.

FIG. 11 is an illustration representing an exemplary marketing campaign edit text interface for a self-serve tool of an online marketing campaign hub, consistent with disclosed embodiments. As shown in FIG. 11, a user operating a window 1102 of an interface 1100 may edit and change text, and a pop-up window 1104 may emerge which may allow for editing the textual content 1106. After editing is concluded, a professional may select a check box or an "X" box to close window 1104.

Figure 12:
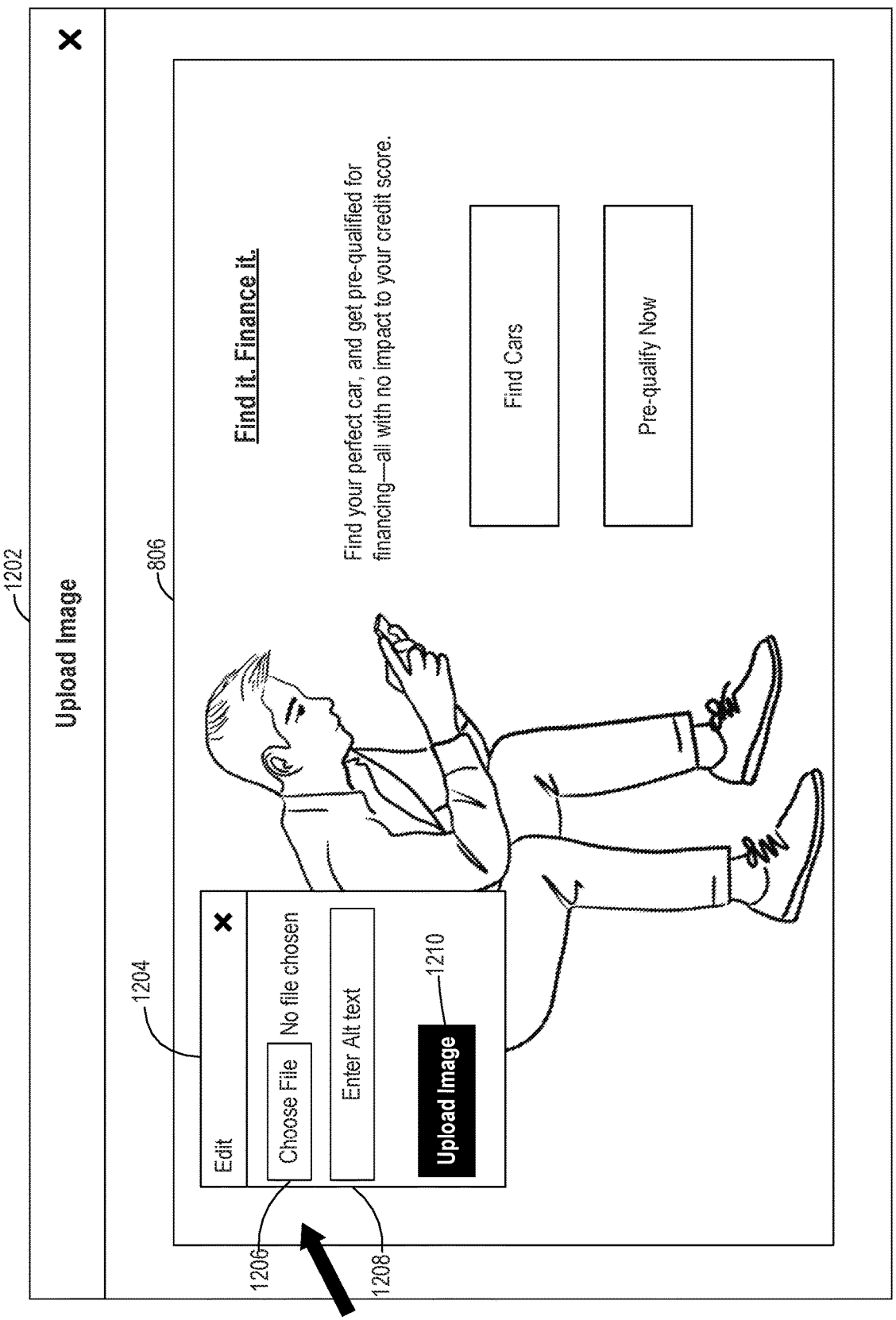
FIG. 12 is an illustration representing an exemplary marketing campaign upload image interface for a self-serve tool of an online marketing campaign hub, consistent with disclosed embodiments.

FIG. 12 is an illustration representing an exemplary marketing campaign upload image interface for a self-serve tool of an online marketing campaign hub, consistent with disclosed embodiments. As shown in FIG. 12, a user operating a window 1202 of an interface 1200 may upload a file or an image. A user may select from a window 1204 to "Choose File" 1206 or to "Enter Alt text" 1208, and then may upload the image by selecting a button 1210. For example, an uploaded image may be an image of a person looking at his cell phone (as shown in FIG. 12).

Figure 13:
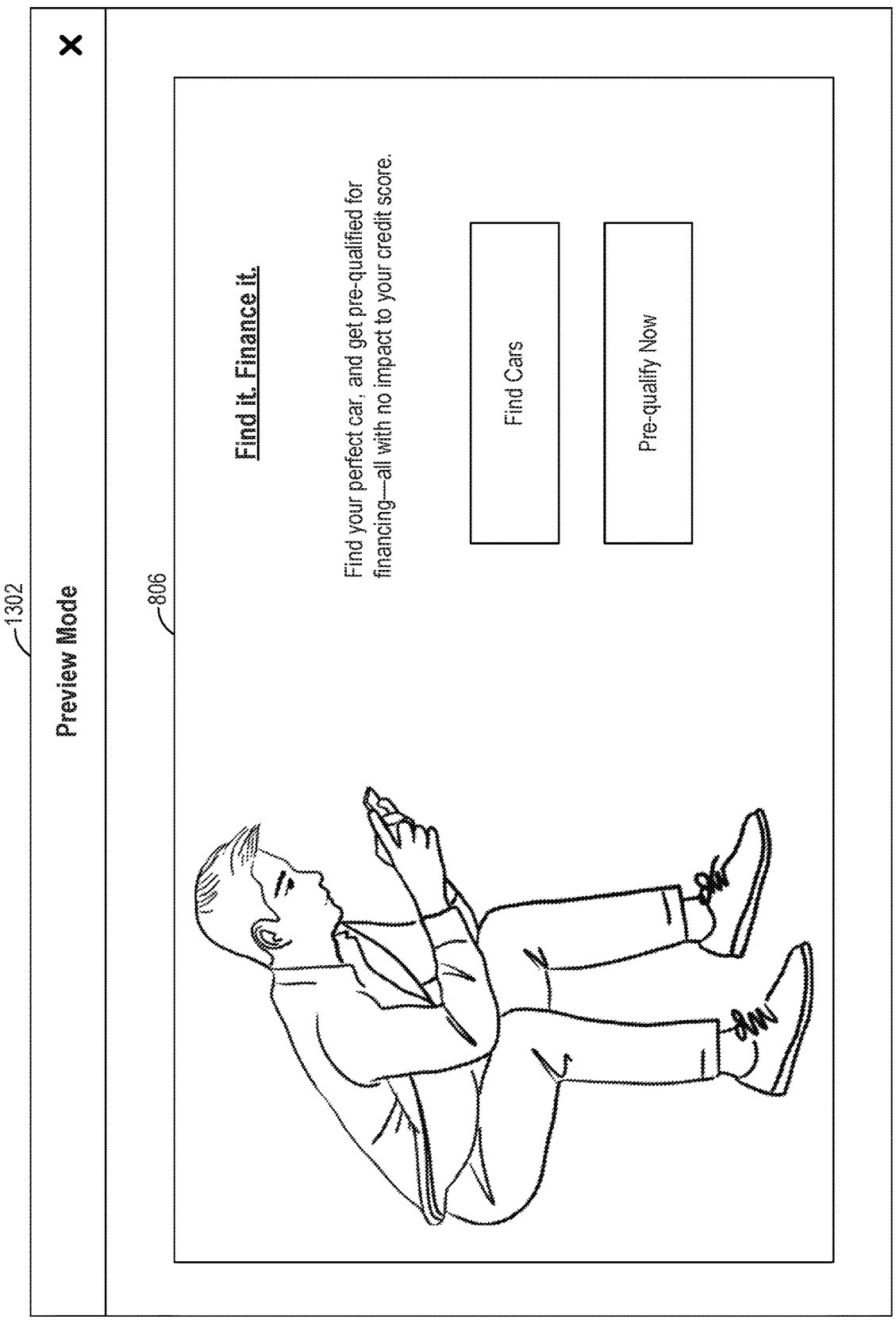
FIG. 13 is an illustration representing an exemplary marketing campaign preview mode interface for a self-serve tool of an online marketing campaign hub, consistent with disclosed embodiments.

FIG. 13 is an illustration representing an exemplary marketing campaign preview mode interface for a self-serve tool of an online marketing campaign hub, consistent with disclosed embodiments. As shown in FIG. 13, a "Preview Mode" for an interface 1300 and a window 1302 may be displayed to show the base template, edited text, and uploaded image. A user may preview a webpage before it goes live. If the user does not like the preview, the user may change any of the base template, edited text, or uploaded image.

Figure 14:
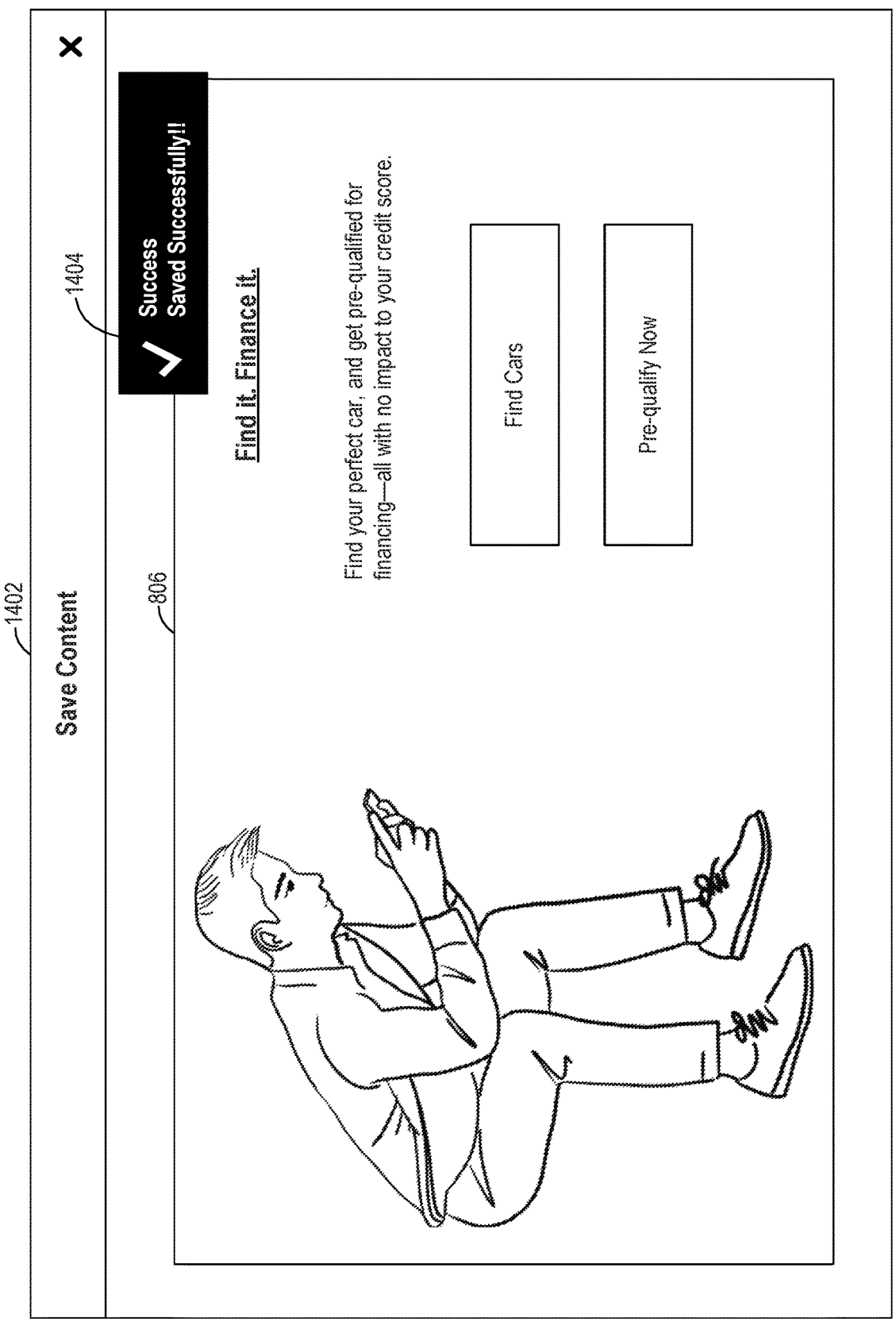
FIGS. 14-15 are illustrations representing exemplary marketing campaign save-content interfaces for a self-serve tool of an online marketing campaign hub, consistent with disclosed embodiments.
Figure 15:
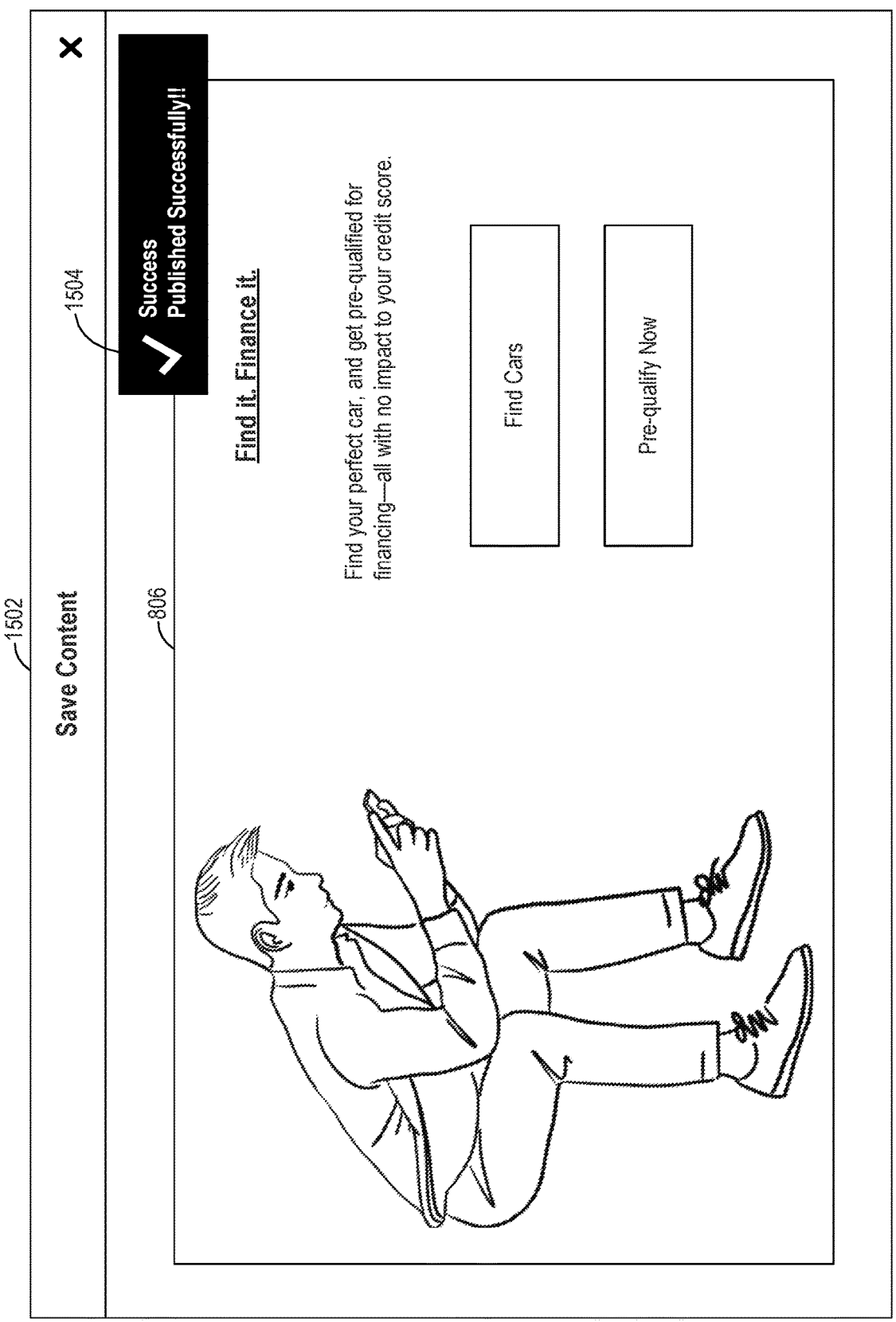

FIGS. 14-15 are illustrations representing exemplary marketing campaign save content interfaces for a self-serve tool of an online marketing campaign hub, consistent with disclosed embodiments. As shown, in FIGS. 14-15, once the changes shown in "Preview Mode" of FIG. 13 are considered acceptable to the user, the user may save the changes as shown in screens 1400 and 1500 (in windows 1402 and 1502) as shown by icons stating "Success Saved Successfully" 1404 and "Success Published Successfully" 1504. The user then may both save and publish the webpage so that it may be external facing and operate as a winning webpage.

Returning to FIG. 5, at step 512, computer system 100 may trigger a workflow process to solicit approval of webpages for a marketing campaign. FIGS. 16-19 are exemplary illustrations representing marketing campaign approval interfaces for a self-serve tool of an online marketing campaign hub, consistent with disclosed embodiments.

Figure 16:
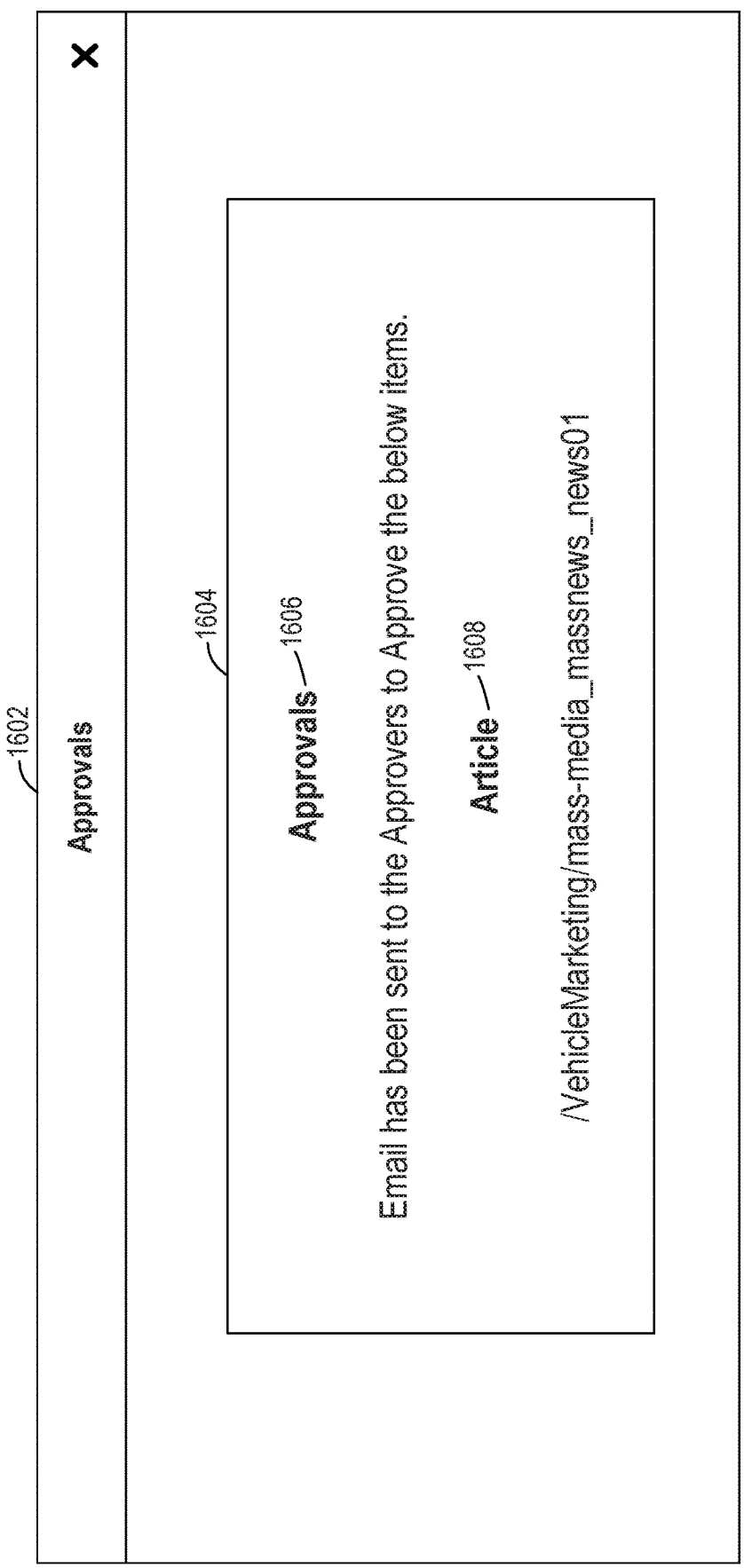
FIGS. 16-19 are illustrations representing exemplary marketing campaign approval interfaces for a self-serve tool of an online marketing campaign hub, consistent with disclosed embodiments.
Figure 17:
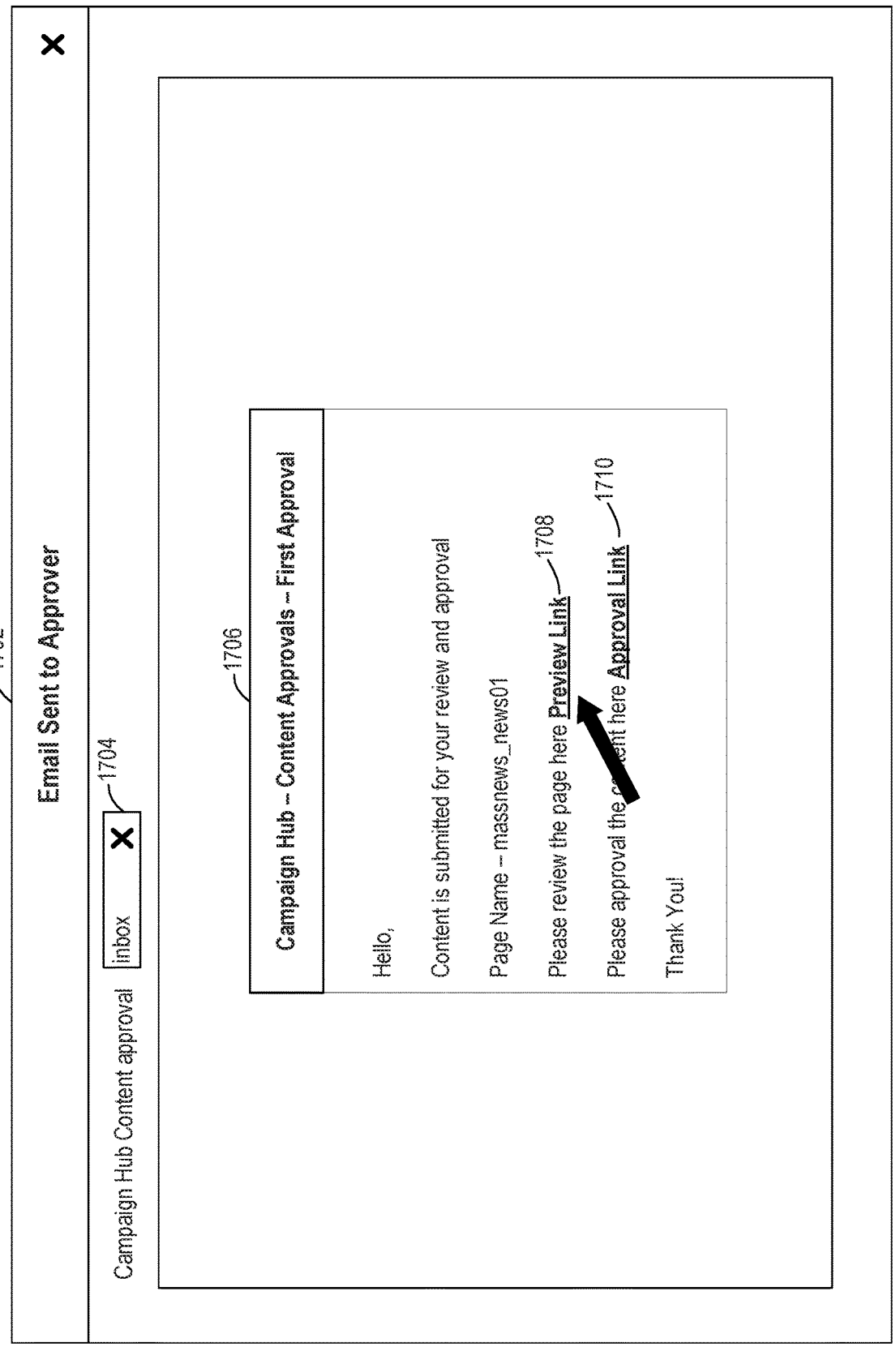

As shown in FIG. 16, an interface 1600 may permit server 208 (FIG. 2) to generate approval interfaces 224 including a first approval interface 228. For example, first approval interface 228 may be generated in the form of an Approvals window 1602 and may include a GUI 1604 categorized into Approvals 1606 and Articles 1608. Text may state "Email has been sent to the Approvers to Approve the below items" and may list a URL associated with Articles 1608, such as "VehicleMarketing/mass-media_massnews_news01." The approval indicates that a URL containing an article has been sent to approvers to approve the publishing of the online article.

As shown in FIG. 17, a user interface 1700 may permit server 208 to generate approval interface 224 in the form of email interface 232. For example, email interface 232 may be generated in the form of a window 1702 is presented in an email inbox 1704 to an approver in response to the submission resulting from FIGS. 15-16. User interface 1700 may include an email 1706 presenting a small paragraph of text that includes "Hello, Content is submitted for your review and approval" and may include "Page Name" and provide a "Preview Link" 1708 and an "Approval Link" 1710 for the Approver to select and then approve.

Figure 18:
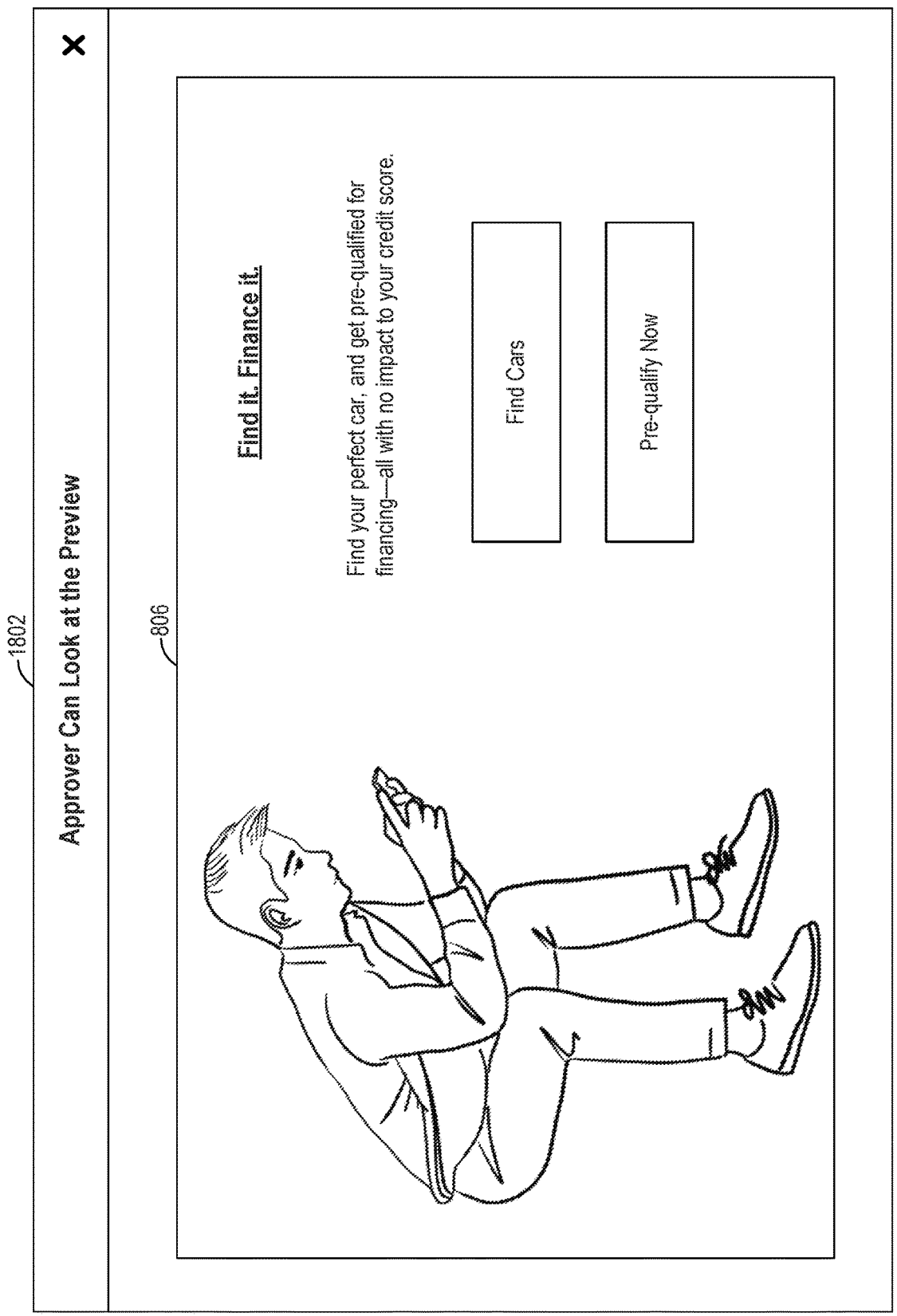
Figure 19:
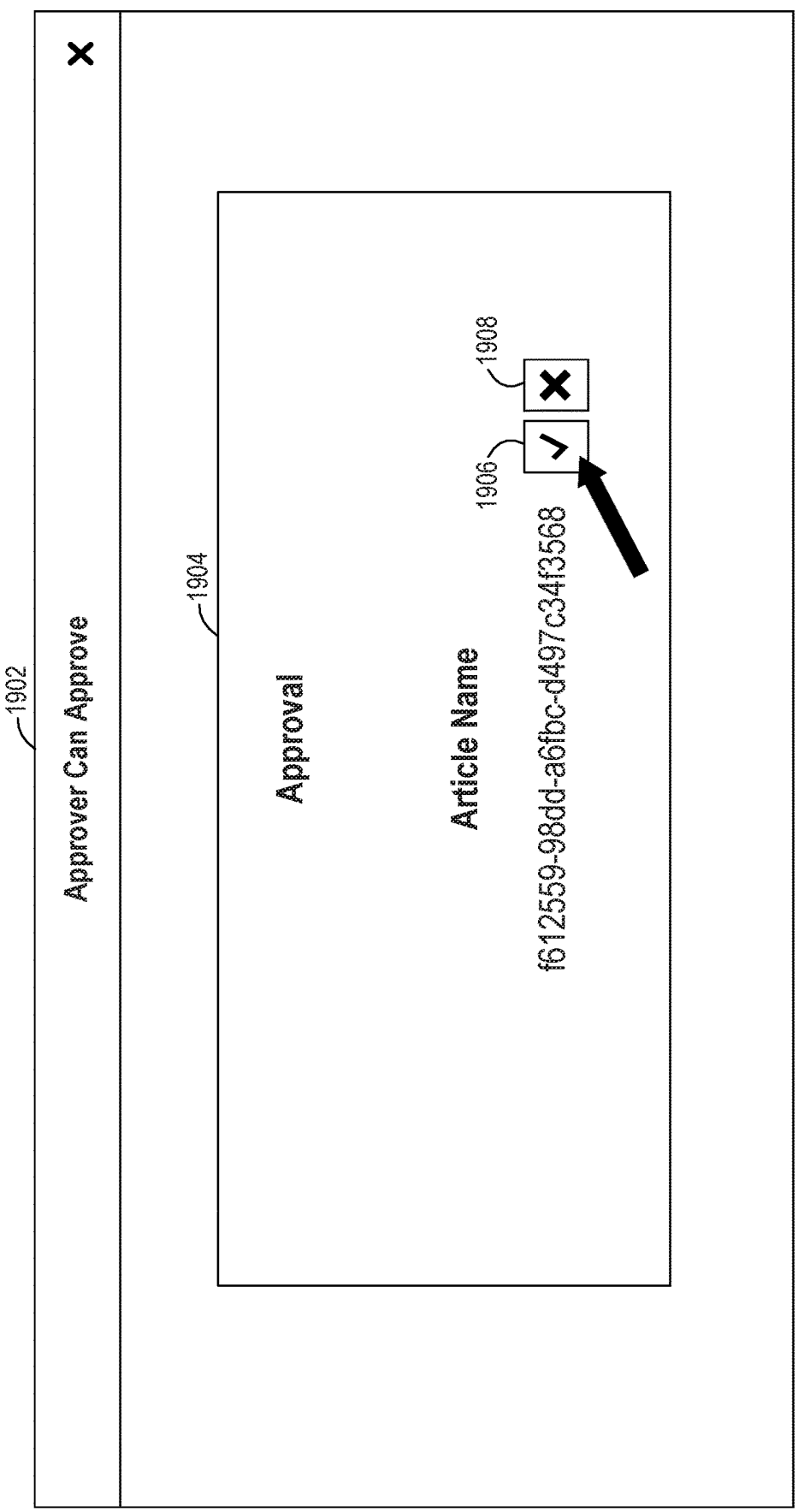

As shown in FIGS. 18 and 19, a preview interface 1800 may permit server 208 to generate approval interface 224 in the form of second interface 230. For example, second interface 232 may be generated in the form of a window 1802 and/or representing an approval interface 1900 with a window 1902 including an approval box 1904, where approvers can review and then approve or deny publishing the article online, consistent with disclosed embodiments. Approval may include a checkbox icon 1906 and rejection may include an "X" box 1908 icon.

Figure 20:
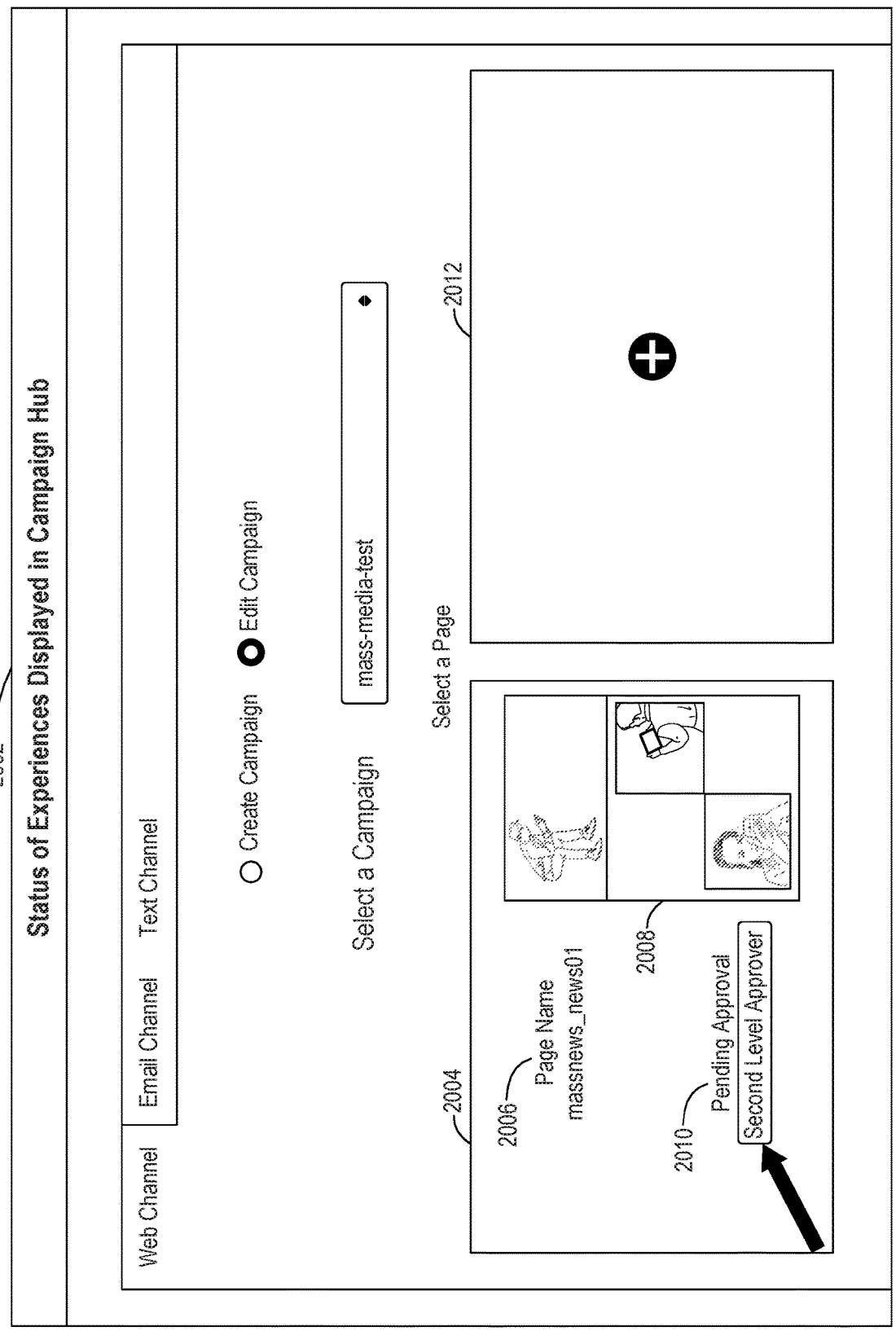
FIG. 20 is an illustration representing an exemplary marketing campaign status interface for a self-serve tool of an online marketing campaign hub, consistent with disclosed embodiments.

FIG. 20 is an illustration representing an exemplary marketing campaign status interface for a sell-serve tool of an online marketing campaign hub, consistent with disclosed embodiments. As shown in FIG. 20, a status of the experiences may be displayed in an interface 2000 and a window 2002 to a user. For example, if a webpage is awaiting approval, a graphical box 2004 may indicate a page name 2006, an associated graphical icons 2008, and an icon 2010 indicating "pending approval". After a first approval, a second approval may also be required. A plus icon 2012 may also be selected to add additional approvers. One or more second level approvers may be contemplated, and other approval statuses may be contemplated.

Figure 21:
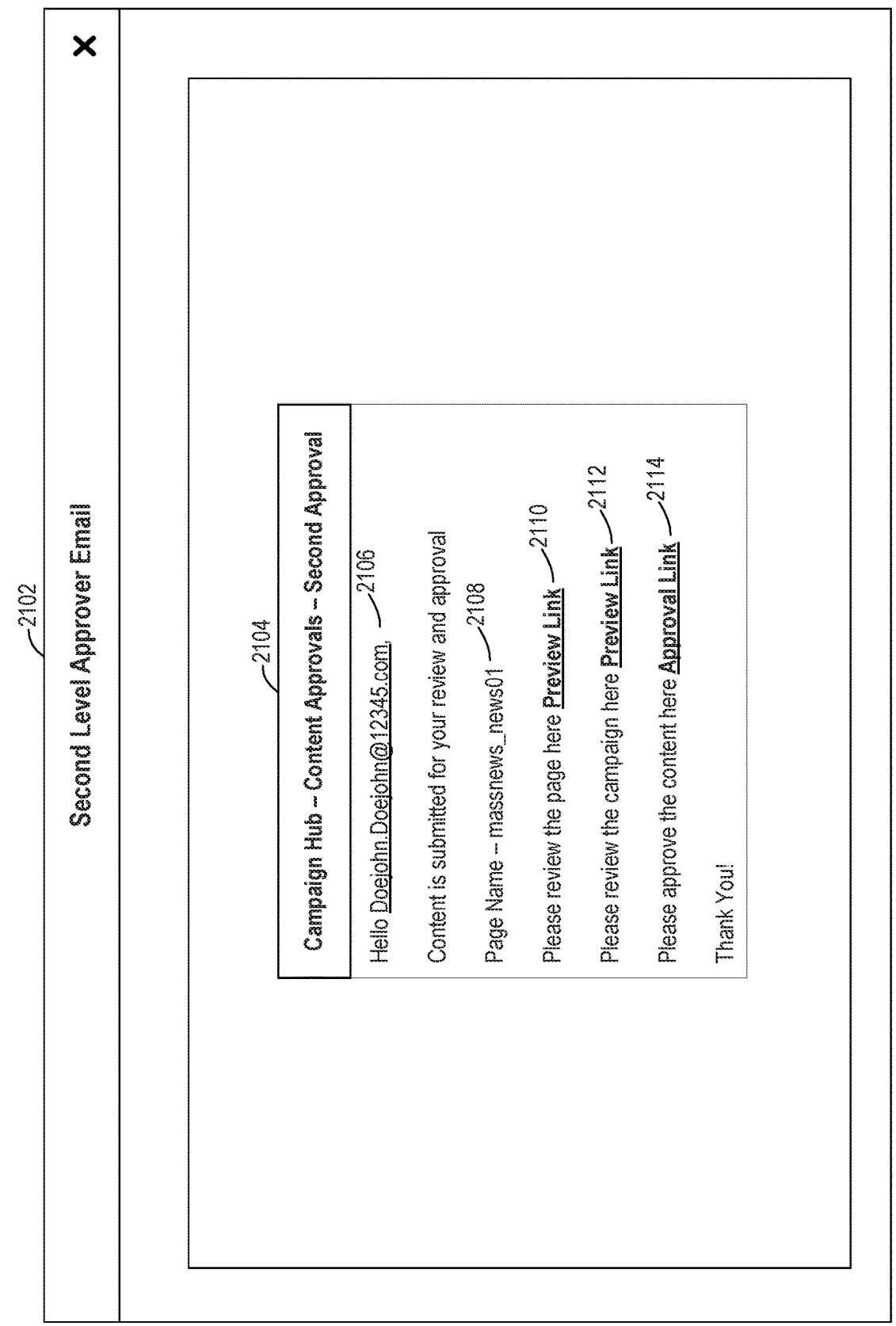
FIGS. 21-22 are an illustrations representing exemplary marketing campaign second level approver email interfaces for a self-serve tool of an online marketing campaign hub, consistent with disclosed embodiments.
Figure 22:
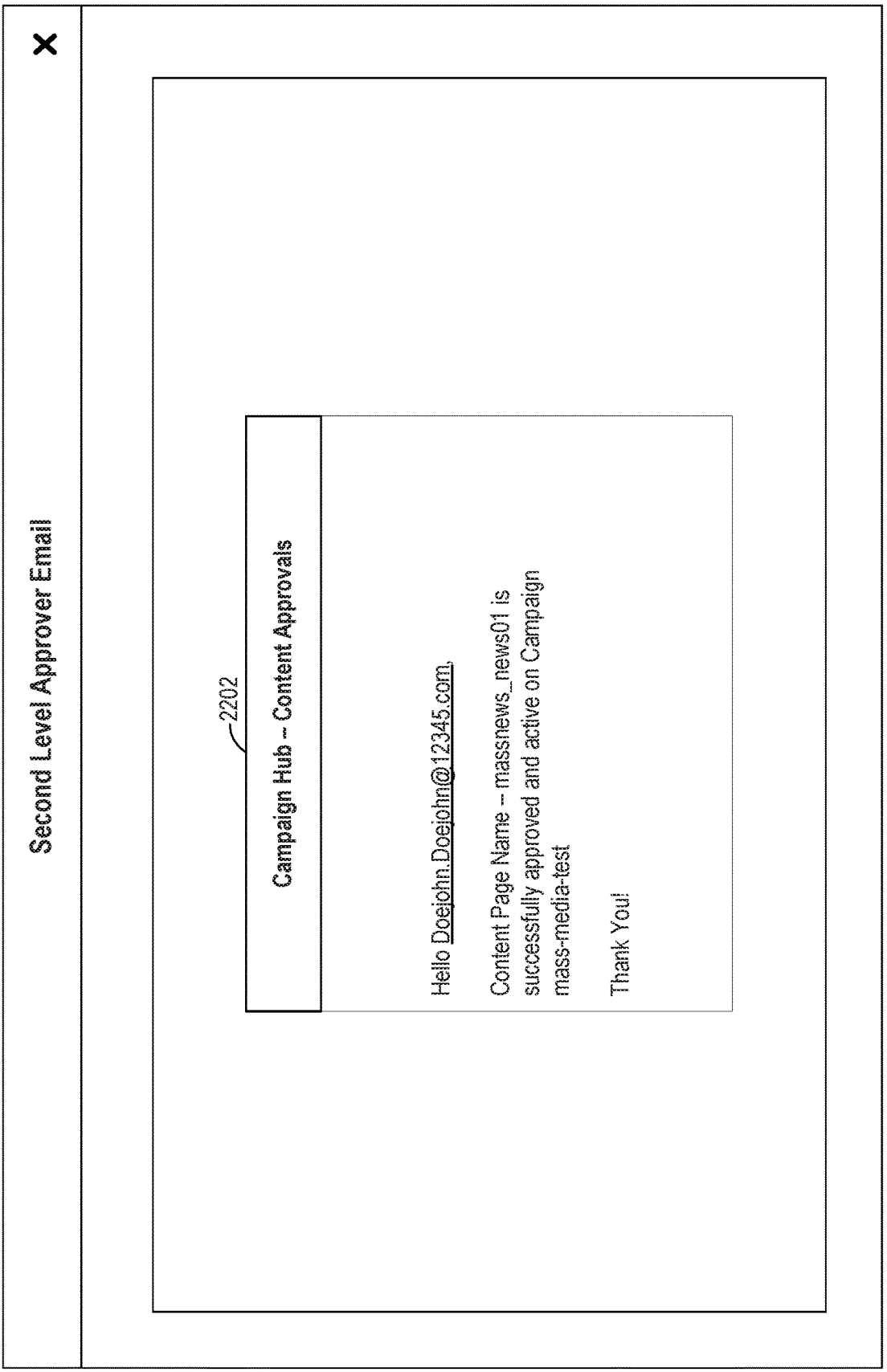

FIGS. 21-22 are an illustrations representing exemplary marketing campaign second level approver email interfaces for a self-serve tool of an online marketing campaign hub, consistent with disclosed embodiments. As shown in an interface 2100 and a window 2102 of FIG. 21, a second level approver email 2104 may be sent, consistent with the original approver email as indicated above. Email 2104 may include an email address 2106, a page name 2108, preview links 2110, 2112, and an approval link 2114. Second level approver email 2202 may include simple approval content (as shown in FIG. 22) once the second level approver approves the content.

Returning again to FIG. 5, at step 514, once approval workflow is completed, the marketing campaign may be registered under multi-armed bandit engine API 210 so that all webpages will be live in production. At step 516, over a period of time, system 100 analyzes which page is winning by collecting feedback and begins serving the winning page more and more without manual intervention. In particular, the recommendation algorithm may perform steps including showing a webpage, marking an experience as a failure, and waiting for precise data input such as clicks or a user selecting a button. Based on the precise data input, the bandit algorithm may mark the experience as a success, and then may show the webpage. The recommendation algorithm may repeat this process until the recommendation algorithm learns which webpage yields the maximum rewards and is determined to be the "winning webpage." Computer system 100 may then automatically display the winning webpage at a higher rate than the remaining first and second (other)

webpages. Computer system 100 may continue to determine, based on collected feedback and analysis of the first and second webpages, a winning webpage.

At step 518, user 202 may interact with computer system 100 to automatically display a number of impressions associated with each of first and second webpages on a graphical user interface (GUI). In particular, a user may see on a dashboard how each of the webpages in the campaign is doing (e.g. number of clicks, etc.) Other dashboard webpage statistics may be contemplated. At step 520, an external customer selecting a URL to visit a website may be navigated to one of a plurality of webpage experiences 522, 524, 526, and 528 published by the user.

Figure 23:
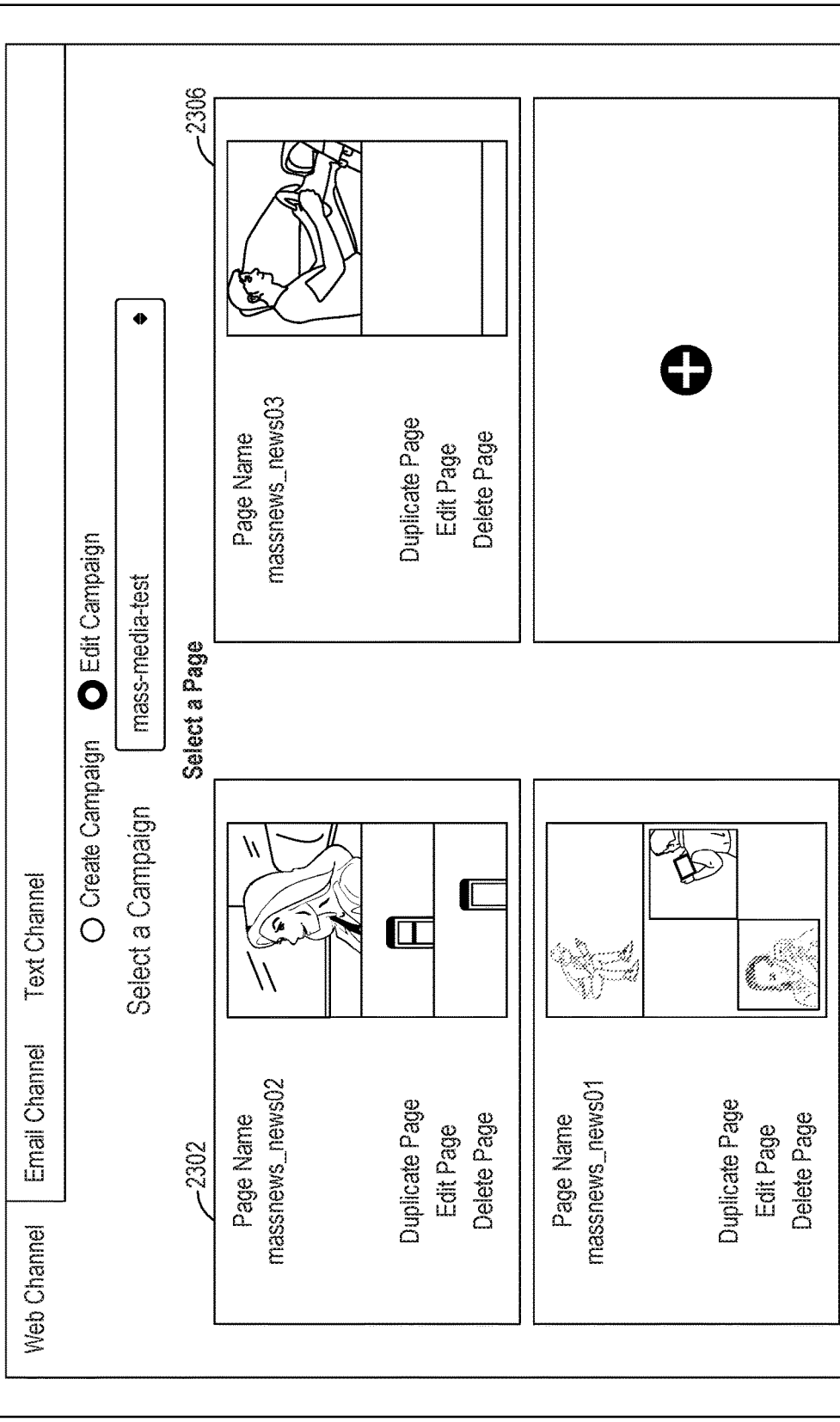
FIG. 23 is an illustration representing an exemplary marketing campaign adding experiences interface for a self-serve tool of an online marketing campaign hub consistent with disclosed embodiments.
Figure 24:
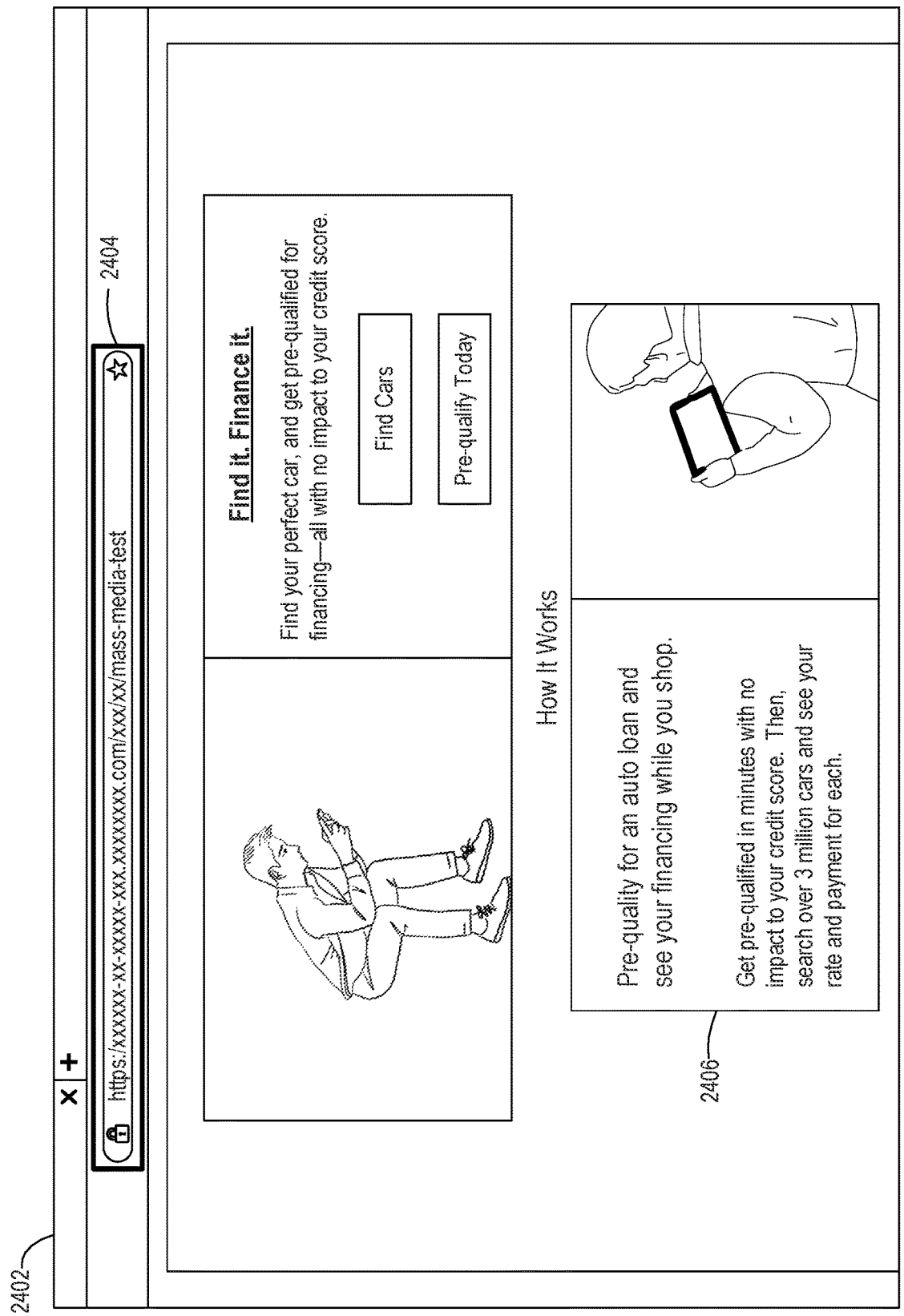
Figure 25:
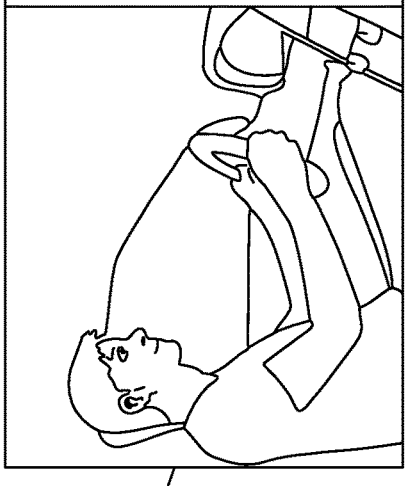
Figure 26:
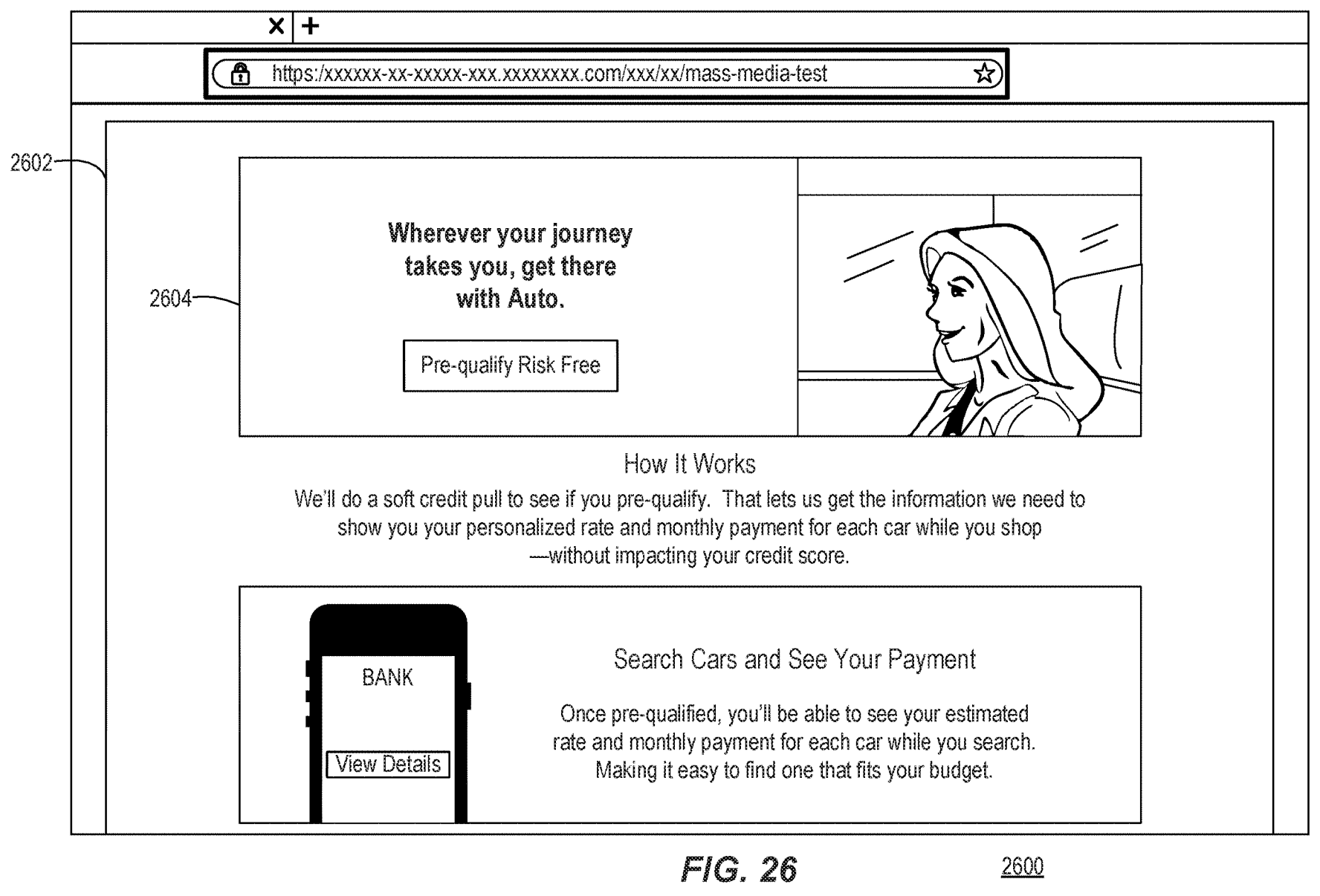

FIG. 23 is an illustration representing, in an exemplary marketing campaign, an "adding experiences" interface for a self-serve tool of an online marketing campaign hub consistent with disclosed embodiments. FIGS. 24-26 are illustrations representing a sequence of exemplary interfaces correlating to a self-serve tool of an online marketing campaign hub, consistent with disclosed embodiments.

As shown in FIGS. 23-26, user 202, such as a marketing professional, may interact with an interface 2300 and may click to select one of webpages 2302, 2304, and 2306 representing paid search ads. Interface 2300 may be an internal tool not referenced by an external customer. Customers may land on URL 520 (as shown in FIG. 5) resulting from multi-armed bandit engine API 210 (and recommendation algorithm) to return one of three experiences (webpages) as also shown in FIGS. 24-26, respectively. As discussed above, the recommendation algorithm may be leveraged as a way of identifying which webpage to exploit and explore as a sub-algorithm or a subset of steps. As discussed above, the recommendation algorithm may perform steps including showing a webpage, marking an experience as a failure, and waiting for precise data input such as clicks, or a user selecting a button. Based on the precise data input, the recommendation algorithm may mark the experience as a success. The recommendation algorithm may repeat this process until the recommendation Algorithm learns which webpage yields the maximum rewards and is determined to be the "winning webpage."

Each of FIGS. 24-26 constitute different webpages as shown. Other webpages may be contemplated. As shown in FIG. 24, an interface 2400 with a window 2402 includes a URL 2404 with one or more sample GUIs 2406. As shown in FIG. 25, an interface 2500 includes a window 2502 with a different sample GUI 2504 corresponding to a different webpage. As shown in FIG. 26, an interface 2600 includes a window 2602 with a different sample GUI 2604 corresponding to an alternate webpage experience. Multiple different GUIs and different associated text may be associated with different web experiences under any test such as the "campaign mass-media test" as shown in FIGS. 23-26. Multiple winning webpages may be accessible to customers visiting a user's website.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. A computer system comprising:
an interface database containing a plurality of graphical user interfaces (GUIs), the plurality of GUIs including a marketing campaign creation interface, a marketing campaign editor interface, a marketing campaign upload interface, a marketing campaign approval interface, one or more marketing campaign preview interfaces, and one or more marketing campaign save interfaces;
a self-serve tool comprising one or more of the plurality of GUIs, the self-serve tool in data communication with the interface database to provide the one or more of the plurality of GUIs upon receipt of a selection;
a marketing campaign hub in data communication with the self-serve tool, the marketing campaign hub configured to generate an external-facing webpage experience shown to users or potential customers visiting webpages or winning webpages selected for their consumption based upon contents to be displayed on the one or more of the plurality of GUIs; and
a multi-armed bandit engine application programming interface (API) in data communication with the self-serve tool and the marketing campaign hub, the multi-armed bandit engine API being registered with the marketing campaign huh, and comprising rules for analyzing webpages published by the marketing campaign hub and for serving a winning webpage from the webpages, wherein
the multi-armed bandit API is configured to receive a plurality of creatives for a webpage, the webpage being published by the marketing campaign hub to a viewer and resulting in a viewer experience, wherein the plurality of creatives include at least one selected from a group of an advertisement and a selected landing page;
the multi-armed bandit API is configured to measure by the rules a result based on the viewer experience, the result comprising conversion rates for a plurality of variants of the webpage, and the variants being categorized based on a user selection, wherein the conversion rates include, at least one selected from a group of a percentage number of webpage views to related webpage views or a percentage value of website visitors that execute a threshold number of webpage clicks;
the multi-armed bandit API is configured to dynamically compare the received creatives and the conversion rates;
the multi-armed bandit API is configured to automatically analyze the variants based on the comparison;
the multi-armed bandit API is configured to automatically select, based on the analysis and the categorization of the variants, a winning webpage variant exceeding a computed threshold, wherein the winning webpage variant is selected based on a probability that maximizes an expected reward using a formula $$\int \prod \left[ E(\tau \mid \alpha^*, x, \theta) = \max_{\alpha'} E(\tau \mid \alpha', x, \theta) \right] P(\theta \mid D) d\theta,$$

$\Pi$ being an indicator function, $\alpha$ being a webpage, $\tau$ being a reward, $\theta$ being a parameter of a distribution of $\tau$, x being a context, and D being past observation triplets; and the multi-armed bandit API and the market campaign hub are configured to automatically adjust online traffic such that the selected winning webpage variant is displayed more frequently than other webpages.

2. The system of claim 1, wherein the creatives comprise a plurality of advertisements.

3. The system of claim 1, wherein the conversion rates further comprise a measured percentage of website viewers that purchase a product from the variants.

4. The system of claim 1, wherein the marketing campaign huh is configured to display the selected winning webpage on a graphical user interface of a client device.

5. A method implemented in a computer system, wherein the computer system comprises an interface database containing a plurality of graphical user interfaces (GUIs), the plurality of GUIs including a marketing campaign creation interface, a marketing campaign editor interface, a marketing campaign upload interface, a marketing campaign approval interface, one or more marketing campaign preview interfaces, and one or more marketing campaign save interfaces;

a self-serve tool comprising one or more of the plurality of GUIs, the self-serve tool in data communication with the interface database to provide the one or more of the plurality of GUIs upon receipt of a selection;

a marketing campaign huh in data communication with the self-serve tool, the marketing campaign hub configured to generate an external-facing webpage experience shown to users or potential customers visiting webpages or winning webpages selected for their consumption based upon contents to be displayed on the one or more of the plurality of GUIs; and a multi-armed bandit engine application programming interface (API) in data communication with the self-serve tool and the marketing campaign huh, the multi-armed bandit engine API being registered with the marketing campaign huh, and comprising rules for analyzing webpages published by the marketing campaign hub and for serving a winning webpage from the webpages, the method comprising:

receiving, by the multi-bandit API, a plurality of creatives for a webpage, the webpage being published by the marketing campaign hub to a viewer and resulting in a viewer experience, wherein the plurality of creatives include at least one selected from a group of an advertisement and a selected landing page;

measuring, by the multi-bandit API, a result based on the viewer experience, the result comprising conversion rates for a plurality of variants of the webpage, and the variants being categorized based on a user selection, wherein the conversion rates include at least one selected from a group of a percentage number of webpage views to related webpage views or a percentage value of website visitors that execute a threshold number of webpage clicks;

determining, by the multi-bandit API, confidence intervals in association with the conversion rates;

dynamically comparing, by the multi-bandit API, the received creatives and the conversion rates;

automatically analyzing, by the multi-bandit API, the variants based on the comparison;

automatically selecting, by the multi-bandit API based on the analysis and the categorization of the variants, a winning webpage variant, the winning webpage variant exceeding a computed threshold, wherein the winning webpage variant is selected based on a probability that maximizes an expected reward using a formula $$\int \prod \left[ E(\tau \mid \alpha^*, x, \theta) = \max_{\alpha'} E(\tau \mid \alpha', x, \theta) \right] P(\theta \mid D) d\theta,$$

$\Pi$ being an indicator function, $\alpha$ being a webpage, $\tau$ being a reward, $\theta$ being a parameter of a distribution of $\tau$, x being a context, and D being past observation triplets; and automatically adjusting, by the multi-bandit API and the marketing campaign hub, online traffic such that the selected winning webpage variant is displayed more frequently than other webpages.

6. The method of claim 5, wherein the creatives comprise a plurality of advertisements.

7. The method of claim 5, wherein the conversion rates comprise a measured percentage of website viewers that purchase a product from the variants.

8. The method of claim 5, further comprising displaying, by the marketing campaign hub, the selected winning webpage on a graphical user interface of a client device.

9. A non-transitory computer-readable medium storing instructions executable by a computer system, wherein the computer system comprises:

an interface database containing a plurality of graphical user interfaces (GUIs), the plurality of GUIs including a marketing campaign creation interface, a marketing campaign editor interface, a marketing campaign upload interface, a marketing campaign approval interface, one or more marketing campaign preview interfaces, and one or more marketing campaign save interfaces;

a self-serve tool comprising one or more of the plurality of GUIs, the self-serve tool in data, communication with the interface database to provide the one or more of the plurality of GUIs upon receipt of a selection;

a marketing campaign hub in data communication with the self-serve tool, the marketing campaign huh configured to generate an external-facing webpage experience shown to users or potential customers visiting webpages or winning webpages selected for their consumption based upon contents to be displayed on the one or more of the plurality of GUIs; and a multi-armed bandit engine application programming interface (API) in data communication with the self-serve tool and the marketing campaign hub, the multi-armed bandit engine API being registered with the marketing campaign hub, and comprising rules for analyzing webpages published by the marketing campaign hub and for serving a winning webpage from the webpages, the instructions, when executed by the computer system, cause the computer system to perform operations comprising:
- receiving, by the multi-armed bandit API, a plurality of creatives for a webpage, the webpage being published by the marketing campaign hub to a viewer and resulting in a viewer experience, wherein the plurality of creatives include at least one selected from a group of an advertisement and a selected landing page;
- measuring, by the multi-armed bandit API, a result based on the viewer experience, the result comprising including conversion rates for a plurality of variants of the webpage, and the variants being categorized based on a user selection, wherein the conversion rates include at least one selected from a group of a percentage number of webpage views to related webpage views or a percentage value of website visitors that execute a threshold number of webpage clicks;
- dynamically comparing, by the multi-armed bandit API, the received creatives and the conversion rates;
- automatically analyzing, by the multi-armed bandit API, the variants based on the comparison;
- automatically selecting, by the multi-armed bandit API, based on the analysis and categorization of the variants, a winning webpage variant exceeding a computed threshold, wherein the winning webpage is selected based on a probability that maximizes an expected reward using a formula $$\int \prod \left[ E(\tau \mid \alpha^*, x, \theta) = \max_{\alpha'} E(\tau \mid \alpha', x, \theta) \right] P(\theta \mid D) d\theta,$$

$\Pi$ being an indicator function, $\alpha$ being a webpage, $\tau$ being a reward, $\theta$ being a parameter of a distribution of $\tau$, $x$ being a context, and $D$ being past observation triplets; and
- automatically adjusting, by the multi-armed bandit API and the marketing campaign huh, online traffic such that the selected winning webpage is displayed more frequently than other webpages.

10. The non-transitory computer-readable medium of claim 9, wherein the creatives comprise a plurality of advertisements.

11. The non-transitory computer-readable medium of claim 9, wherein the conversion rates comprise a measured percentage of website viewers that purchase a product from the variants.

12. The non-transitory computer-readable medium of claim 9, the operations farther comprising displaying, by the marketing campaign hub, the selected winning webpage on a graphical user interface of a client device.

* * * * *